(12) United States Patent
Nordmeyer

(10) Patent No.: US 7,959,136 B2
(45) Date of Patent: *Jun. 14, 2011

(54) SENSING AND COMMUNICATION SYSTEM AND METHOD

(75) Inventor: Daniel L. Nordmeyer, Indianapolis, IN (US)

(73) Assignee: BFS Diversified Products, LLC, Indianapolis, IN (US)

( * ) Notice: Subject to any disclaimer, the term of this patent is extended or adjusted under 35 U.S.C. 154(b) by 459 days.

This patent is subject to a terminal disclaimer.

(21) Appl. No.: 12/040,278

(22) Filed: Feb. 29, 2008

(65) Prior Publication Data

US 2008/0136669 A1    Jun. 12, 2008

Related U.S. Application Data

(63) Continuation of application No. 11/115,801, filed on Apr. 27, 2005, now Pat. No. 7,364,144.

(51) Int. Cl.
*F16F 9/04* (2006.01)
(52) U.S. Cl. .................................. 267/64.27; 340/10.1
(58) Field of Classification Search .... 267/64.11–64.28; 92/5 R; 91/1; 73/865.9; 324/635; 342/118, 342/128, 134, 125; 340/10.1, 572.1, 10.31; 702/159
See application file for complete search history.

(56) References Cited

U.S. PATENT DOCUMENTS

| 3,780,370 A | 12/1973 | Reeves |
| 3,859,624 A | 1/1975 | Kriofsky et al. |
| 4,041,490 A | 8/1977 | Watt et al. |
| 4,068,951 A | 1/1978 | Froome et al. |
| 4,072,946 A | 2/1978 | Kneefel |
| 4,183,022 A | 1/1980 | Baudard et al. |
| 4,307,397 A | 12/1981 | Holscher |
| 4,621,705 A | 11/1986 | Etoh |
| 4,646,092 A | 2/1987 | Schreuder |
| 4,737,705 A | 4/1988 | Bitar et al. |
| 4,739,328 A | 4/1988 | Koelle et al. |
| 4,757,315 A | 7/1988 | Lichtenberg et al. |
| 4,798,369 A | 1/1989 | Geno et al. |
| 4,804,961 A | 2/1989 | Hane |

(Continued)

FOREIGN PATENT DOCUMENTS

DE          34 23 602 A1    1/1986

(Continued)

OTHER PUBLICATIONS

International Search Report; PCT/US2007/001532; dated Jun. 12, 2007; mailed Jun. 19, 2007.

(Continued)

*Primary Examiner* — Bradley T King
*Assistant Examiner* — Vu Q Nguyen
(74) *Attorney, Agent, or Firm* — Sarah M. Jabbari; Fay Sharpe LLP

(57) ABSTRACT

A sensing and communication system includes a transceiver broadcasting an electromagnetic wave, a transponder supported on an associated structural member at a distance from the transceiver that receives the electromagnetic wave, and a sensor adjacent the transponder and in communication therewith. The sensor being operable to sense an input acting on the associated structural member and communicate a signal corresponding to the input to the transponder. The transponder is adapted to induce a modulation of the electromagnetic wave in relation to at least one of the sensor signal and the distance between the transceiver and the transponder. A method is also disclosed.

24 Claims, 17 Drawing Sheets

U.S. PATENT DOCUMENTS

| | | |
|---|---|---|
| 4,812,842 A | 3/1989 | Bayerlein et al. |
| 4,817,922 A | 4/1989 | Hovance |
| 5,229,829 A | 7/1993 | Nihei et al. |
| 5,285,189 A | 2/1994 | Nowicki et al. |
| 5,298,904 A | 3/1994 | Olich |
| 5,337,137 A | 8/1994 | Ogawa et al. |
| 5,373,445 A | 12/1994 | Yopp |
| 5,500,065 A | 3/1996 | Koch et al. |
| 5,521,497 A | 5/1996 | Schneider et al. |
| 5,548,291 A | 8/1996 | Meier et al. |
| 5,550,536 A | 8/1996 | Flaxl |
| 5,552,789 A | 9/1996 | Schuermann |
| 5,559,507 A | 9/1996 | Beigel |
| 5,570,086 A | 10/1996 | Hanaoka et al. |
| 5,589,821 A | 12/1996 | Sallen et al. |
| 5,594,448 A | 1/1997 | d'Hont |
| 5,619,207 A | 4/1997 | d'Hont |
| 5,701,121 A | 12/1997 | Murdoch |
| 5,707,045 A | 1/1998 | Easter |
| 5,731,754 A | 3/1998 | Lee, Jr. et al. |
| 5,801,372 A | 9/1998 | Yamaguchi |
| 5,859,692 A | 1/1999 | Ross, Jr. et al. |
| 5,936,161 A | 8/1999 | Fischer |
| 6,036,179 A | 3/2000 | Rensel |
| 6,073,491 A | 6/2000 | Fischer et al. |
| 6,122,329 A | 9/2000 | Zai et al. |
| 6,249,673 B1 | 6/2001 | Tsui |
| 6,309,494 B1 | 10/2001 | Koch et al. |
| 6,356,738 B1 | 3/2002 | Schneider et al. |
| 6,414,626 B1 | 7/2002 | Greef et al. |
| 6,469,590 B1 | 10/2002 | Lewis et al. |
| 6,473,028 B1 | 10/2002 | Luc |
| 6,474,380 B1 | 11/2002 | Rensel et al. |
| 6,614,239 B2 | 9/2003 | Borghi |
| 6,621,278 B2 | 9/2003 | Ariav |
| 6,637,269 B2 | 10/2003 | Reck et al. |
| 6,731,199 B1 | 5/2004 | Ueda |
| 6,765,393 B2 | 7/2004 | Pierenkemper et al. |
| 6,931,930 B2 | 8/2005 | Reck |
| 6,963,301 B2 | 11/2005 | Schantz et al. |
| 7,119,736 B2 | 10/2006 | Heide et al. |
| 7,364,144 B2 * | 4/2008 | Nordmeyer ............... 267/64.27 |
| 2002/0088517 A1 | 7/2002 | Shimura |
| 2002/0180172 A1 | 12/2002 | Gottschalk et al. |
| 2003/0090365 A1 | 5/2003 | Bergerhoff |
| 2003/0150920 A1 | 8/2003 | Parks |
| 2004/0118197 A1 | 6/2004 | Bulst et al. |
| 2004/0130442 A1 | 7/2004 | Breed et al. |
| 2004/0203470 A1 | 10/2004 | Berliner et al. |
| 2004/0257220 A1 | 12/2004 | Fischer et al. |
| 2005/0253697 A1 | 11/2005 | Taguchi |
| 2007/0013544 A1 | 1/2007 | Chiu |

FOREIGN PATENT DOCUMENTS

| | | |
|---|---|---|
| DE | 197 01 530 C1 | 8/1998 |
| DE | 19701530 C1 * | 8/1998 |
| EP | 1 522 431 A | 4/2005 |
| FR | 2 574 188 A1 | 6/1986 |
| GB | 2 177 475 A | 1/1987 |
| JP | 07 181254 A | 7/1995 |
| WO | WO 99/40704 A | 8/1999 |
| WO | WO 99/61936 A | 12/1999 |
| WO | WO 01/84518 A | 11/2001 |
| WO | WO 02/27435 A | 4/2002 |
| WO | WO 2006/073717 A | 7/2006 |

OTHER PUBLICATIONS

Lee and Sorrells, "Passive RFID Basics," Microchip Technology Inc., 2001, pp. 1-8.

* cited by examiner

SENSING AND COMMUNICATION SYSTEM AND METHOD

This application is a continuation of U.S. patent application Ser. No. 11/115,801, filed on Apr. 27, 2005, which is hereby incorporated herein by reference in its entirety.

BACKGROUND

The present novel concept broadly relates to the art of data sensing and communication systems and, more particularly, to a system and method for sensing an input or property of an associated structural member and communicating a signal substantially corresponding to the sensed input using electromagnetic carrier wave modulation.

The subject system and method are amenable to broad use in a wide variety of applications and environments. One example of a suitable application is the use of the subject system and method on and with an associated fluid suspension member, such as an air spring of a vehicle, for example. The subject system and method will be discussed in detail hereinafter with specific reference to use on such an associated fluid suspension member. However, it is to be specifically understood that the subject system and method are capable of broader application and are not intended to be limited to this specific example of a suitable application.

A variety of well known and commonly used devices have been employed to measure or otherwise determine data associated with inputs and/or properties of an associated structural member. Such devices include ultrasonic height sensors, accelerometers, temperature probes or thermocouples, and/or pressure transducers, for example. Such devices, however, suffer from numerous disadvantages and problems which can, under some conditions, undesirably limit the use and application thereof. These disadvantages are particularly salient in certain applications and in use on or with certain structural arrangements, such as arrangements that include relative movement between two components thereof, for example. This is particularly true where one of the components is considered to be a fixed component with the other components moving relative thereto.

One example of such an arrangement can be found in the suspension system of a vehicle. In this example, a chassis member or body panel is considered to be the fixed member and a wheel-supporting structure acts as the moving component. Generally, it is desirable to mount devices for measuring or sensing properties of the suspension system and/or components thereof on or along the fixed member rather than on the moving component. This can result in the availability of more mounting options and often promotes simpler installation of the device on the vehicle. Additionally, mounting the sensing or measuring device on the fixed component allows the attendant wires for electrical power and signal communication to be more easily run and affixed along the frame or body of the vehicle.

In light of the foregoing and other possible reasons, the mounting of sensing and/or measuring devices on members of the suspension system that move relative to the fixed component is generally avoided, except where other alternatives are deemed undesirable or are otherwise unavailable. In such excepted cases, the device is mounted on the moving component and the wires thereof are typically secured along the moving component with a strain relief or other suitable arrangement formed or provided between the fixed and moving components. One example of such a sensing application involves measuring the instantaneous acceleration of the moving component in substantially real time. Such instantaneous acceleration might be sensed and processed that another component, such as a damping member, for example, can be adjusted to offset the acceleration.

While acceleration can be measured in different ways using various components and/or calculations, the use of an accelerometer can provide suitably accurate data or other output signals in substantially real time. Additionally, accelerometers are compact, relatively inexpensive and are normally substantially robust. As such, using an accelerometer is often a preferred method of measuring the acceleration on a wheel or suspension member of a vehicle. Unfortunately, known accelerometers normally include one or more wires to power the sensor and communicate signals and/or data. As such, the wires must be run from the frame or body of the vehicle to the accelerometer with at least a portion of the wire being flexed therebetween as the components move relative to one another. This repeated flexing can undesirably result in breakage due to wire fatigue and/or other problems. What's more, the wire is often undesirably exposed to environmental conditions and contaminants, such as dirt, water and salt, for example. This can undesirably lead to degradation of the wire and/or insulation which can accelerate wire fatigue and breakage. Additionally, the wire is subject to impacts from road debris, which can damage the wire and/or its connection to the sensor.

Accordingly, it is believed desirable to develop a sensing and communication device, system and method to overcome these and other problems and disadvantages.

BRIEF DESCRIPTION

A sensing and communication system in accordance with the present novel concept, for use on an associated structural member undergoing an associated external input, is provided that includes a transceiver adapted to broadcast an electromagnetic wave and a transponder spaced a distance from the transceiver. A sensor is secured on the associated structural member and is in communication with the transponder. The sensor is adapted to generate a sensor output signal in relation to the associated external input. The transponder receives the electromagnetic wave and the sensor output signal, and is adapted to cause a modulation of the electromagnetic wave in relation to the sensor output signal.

A sensing and communication system in accordance with the present novel concept, for use on associated first and second structural members spaced a distance from one another with the associated second structural member undergoing an associated external input, is provided that includes a transceiver supported on the associated first structural member and broadcasting an electromagnetic wave. A transponder is supported on the associated second structural member and receives the electromagnetic wave. A sensor is supported on the associated second structural member and is in communication with the transponder. The sensor generates a sensor output signal in relation to the associated external input. The transponder receives the sensor output signal and modulates the electromagnetic wave in response to at least one of the sensor output signal and the distance.

A method of communicating an input level of an associated external input acting on an associated structural member in accordance with the present novel concept is provided that includes providing a transceiver adapted to broadcast an electromagnetic wave. The method also includes providing a transponder supported on the associated structural member and spaced a distance from the transceiver, and providing a sensor supported on the associated structural member adjacent the transponder. The sensor being adapted to generate a sensor output signal corresponding to the input level of the associated external input. The method further includes energizing the transceiver and broadcasting the electromagnetic wave, and generating the sensor output signal. The method also includes causing a modulation of the electromagnetic wave in relation to the sensor output signal, and determining the input level of the associated external input based on the modulation.

An air spring assembly in accordance with the present novel concept is provided and includes a first end member, a second end member spaced a distance from the first end member and undergoing an external input, and a flexible wall secured between the first and second end members. A transceiver is supported on the first end member and broadcasts an electromagnetic wave. A transponder is supported on the second end member and receives the electromagnetic wave. A sensor is supported on the second end member and is in communication with the transponder. The sensor is adapted to measure the external input of the second end member and generate a corresponding sensor output signal. The transponder receives the sensor output signal and causes a modulation of the electromagnetic wave in relation to the sensor output signal.

A communication system in accordance with the present novel concept, for a vehicle suspension system having a first vehicle component and a second vehicle component undergoing a suspension input, is provided that includes a transceiver supported on the first vehicle component and adapted to broadcast an electromagnetic wave. A transponder is supported on the second vehicle component at a distance from the transceiver and in communication therewith. A sensor is supported on the second vehicle component and is adapted to sense the suspension input, the sensor is in communication with the transponder and is adapted to generate a sensor output signal corresponding to the suspension input. The transponder is adapted to receive the sensor output signal from the sensor and cause a modulation of the electromagnetic wave in relation to the signal.

A method of determining a value of a property of a vehicle suspension member in accordance with the present novel concept is provided that includes providing a transceiver adapted to broadcast an electromagnetic wave and providing a transponder supported on the vehicle suspension member and spaced a distance from the transceiver. The method also includes providing a sensor supported on the vehicle suspension member adjacent the transponder with the sensor adapted to generate a sensor output signal corresponding to the property of the vehicle suspension member. A method also includes energizing the transceiver and broadcasting the electromagnetic wave. The method further includes generating the sensor output signal and causing a modulation of the electromagnetic wave in relation to the sensor output signal. The method further includes determining a value of the property of the vehicle suspension member based on the modulation.

DETAILED DESCRIPTION

Figure 1:
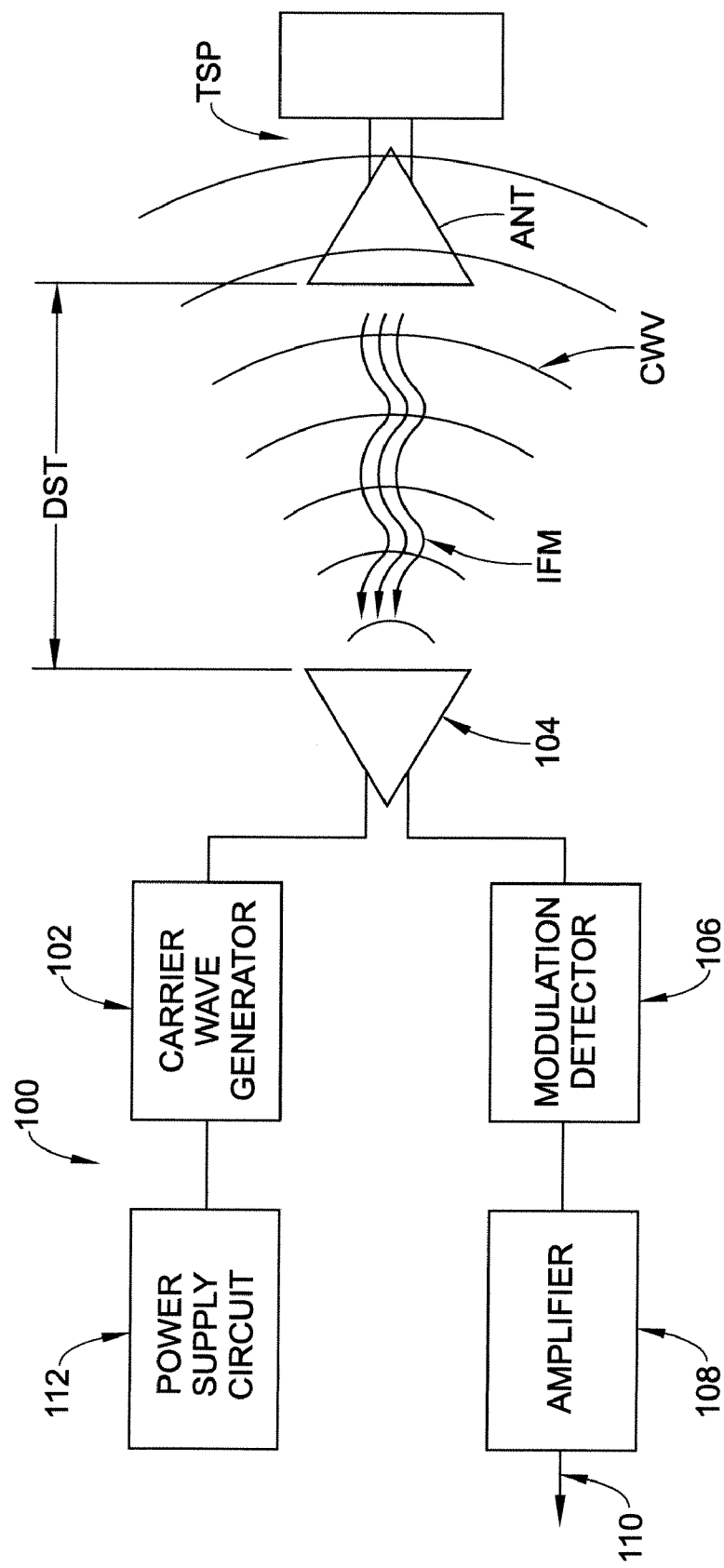
FIG. 1 schematically illustrates one embodiment of distance indicating system in accordance with the present novel concept.

Referring now in greater detail to the drawings wherein the showings are for the purposes of illustrating preferred embodiments of the present novel system, apparatus and/or method only, and not for the purposes of limiting the same, FIG. 1 schematically illustrates a distance indicating system that includes a transceiver 100 in use with a transponder TSP that is spaced a distance DST from the transceiver. It will be appreciated that transponder TSP is merely representative of a suitable transponder cooperable with a transceiver, such as transceiver 100, and that the structure and operation of exemplary embodiments of suitable transponders will be discussed with more specificity hereinafter. Transceiver 100 is operable to broadcast an electromagnetic signal, such as an electromagnetic (EM) carrier wave CWV, for example, toward transponder TSP.

Transceiver 100 includes a carrier wave generator 102 in electrical communication with an antenna 104. Wave generator 102 is adapted to output an electrical carrier wave signal to antenna 104, which in turn is adapted to broadcast an EM carrier wave, such as wave CWV for example, corresponding to the carrier wave signal output by wave generator 102. A modulation detector 106 is also in electrical communication with antenna 104 and is adapted to detect a modulation of an electrical characteristic across or along the antenna. The modulation detector outputs an electrical signal, such as a voltage or current, for example, in corresponding relation to a magnitude of the modulation across or along the antenna. In FIG. 1, modulation detector 106 outputs an analog signal that can be amplified by an optional amplifier 108 prior to being communicated, as indicated generally by arrow 110, to another electronic device, circuit or system, such as an electronic control unit (not shown), for example.

A power supply circuit 112 is also shown in FIG. 1. The power supply circuit can be formed as a part of a fully integrated circuit of transceiver 100, a separate circuit supported on transceiver 100 or as a separate circuit on an entirely separate component from transceiver 100. In one exemplary embodiment, shown in FIG. 1, power supply circuit 112 is formed as a portion of a fully integrated circuit of the transceiver. Regardless of the construction, however, power supply circuit 112 is adapted to provide suitably conditioned and regulated electrical power from a power source (not shown) to the components of transceiver 100. These components can include, without limitation, wave generator 102 to which power supply circuit 112 is shown in FIG. 1 as being in direct electrical connection. It will be appreciated that the power source (not shown) can be any suitable AC or DC power source, such as a battery (vehicle or other), a generator or alternator, an electronic control unit or a power control module, for example.

In general, antenna 104 of transceiver 100 broadcasts or otherwise outputs an EM signal, such as carrier wave CWV, for example, as discussed above. An antenna ANT of transponder TSP receives the carrier wave, which has one or more properties or characteristics that vary with distance, as will be understood by those of ordinary skill in the art. The transponder is operative to induce or otherwise cause a modulation of the carrier wave in relation to the distance between the transceiver and the transponder. In one example of such an operation, it will be recognized by the skilled artisan that antennae 104 and ANT act as the windings of a loosely coupled transformer when under the influence of carrier wave CWV. As such, a momentary change in an electrical characteristic or property of one antenna will induce or otherwise cause a corresponding change or modulation along or across the other antenna. This modulation can be used to determine distance DST between the transceiver and transponder, or alternately to communicate data therebetween, as will be discussed in detail hereinafter.

Figure 2:
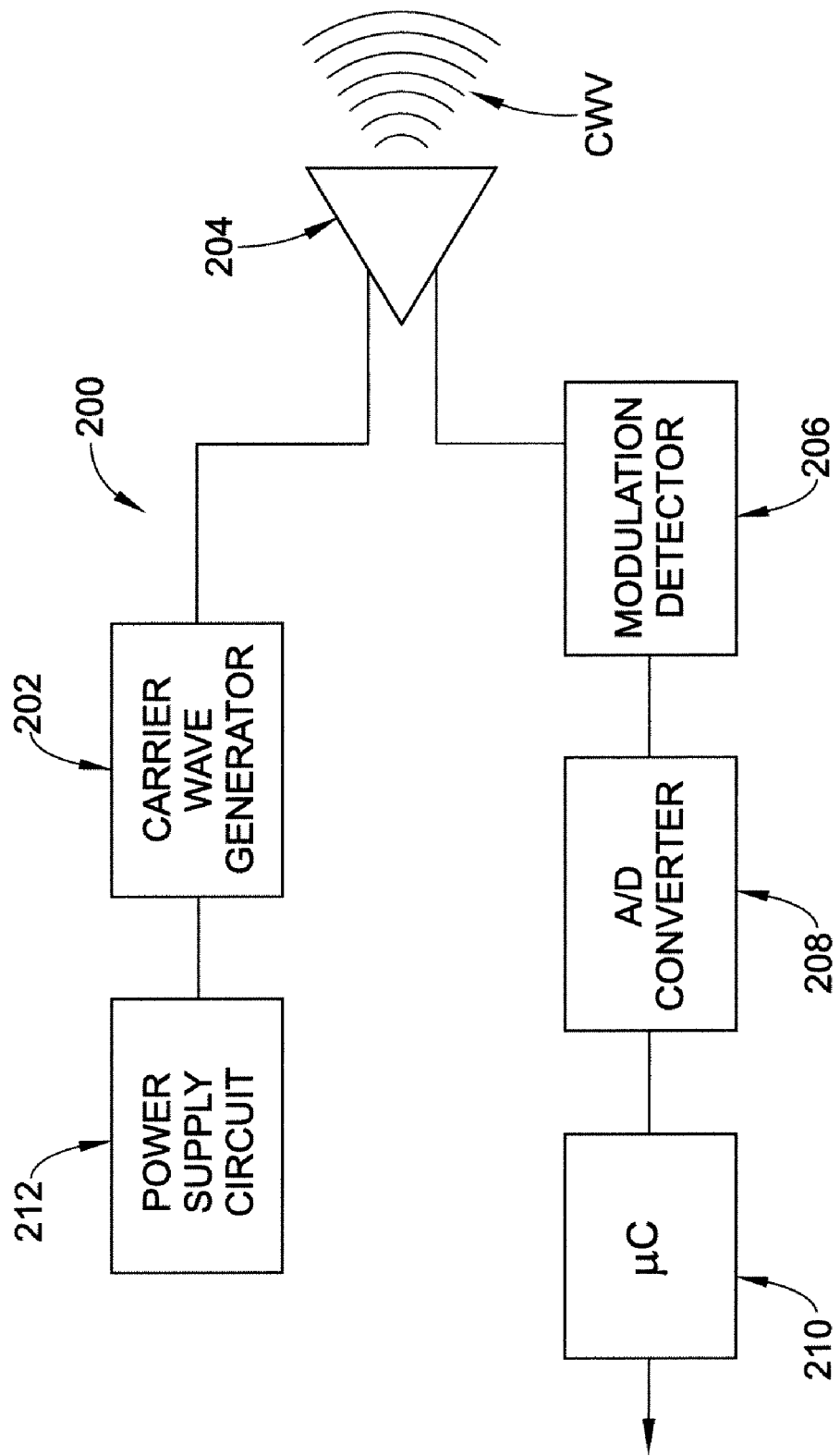
FIG. 2 schematically illustrates an alternate embodiment of the transceiver shown in FIG. 1.

An alternate embodiment of a transceiver 200 is shown in FIG. 2, and includes a carrier wave generator 202 in electrical communication with an antenna 204. Carrier wave generator 202 is adapted to output an electrical carrier wave signal to antenna 204, which receives the carrier wave signal from the wave generator and is adapted to broadcast an EM carrier wave, such as wave CWV, for example, corresponding to the carrier wave signal output by wave generator 202.

A modulation detector 206 is also in electrical communication with antenna 204 and is adapted to detect a modulation of an electrical characteristic across or along the antenna. Modulation detector 206 outputs an analog signal in corresponding relation to a magnitude of the modulation across or along antenna 204. Rather than amplifying the analog output as in transceiver 100, however, transceiver 200 includes an analog-to-digital (A/D) converter 208 that is in electrical communication with the modulation detector. The A/D converter receives the analog signal from modulation detector 206 and converts the same into a digital data stream. The data stream from converter 208 can then be communicated in a typical manner to a device, such as a micro-controller 210, for example, or another component or system. It will be appreciated that such a device or other system, including micro-controller 210 can either be integral with transceiver 200 or a part of another, separate system. For example, such a processor can communicate with or be a component of a vehicle data bus, such as a CAN bus, SAE J1850 data bus, or other vehicle information system, for example.

A power supply circuit 212 is shown in FIG. 2. It will be appreciated, however, that power supply circuit 212 can be provided in any one of various implementations and/or configurations, as discussed above, to provide suitably conditioned and regulated power to circuit 200.

Carrier wave generators 102 and 202 are adapted to output an electrical carrier wave signal suitable for broadcast as an EM carrier wave by the associated antenna. In one preferred embodiment, the electrical carrier wave signal output by generators 102 and 202 is a sine wave having a substantially constant amplitude and frequency, though it is to be distinctly understood that any suitable electrical carrier wave signal can be used. It will be appreciated that the electrical signal output by the generators can have any suitable voltage, such as from about 50 volts to about 100 volts, for example, and can have any suitable frequency, such as from about 100 kHz to about 30 MHz, for example. In one exemplary embodiment, the electrical signal has a frequency of about 125 kHz and an amplitude of about 100 volts, though such values can vary from application to application, as mentioned above.

Figure 3:
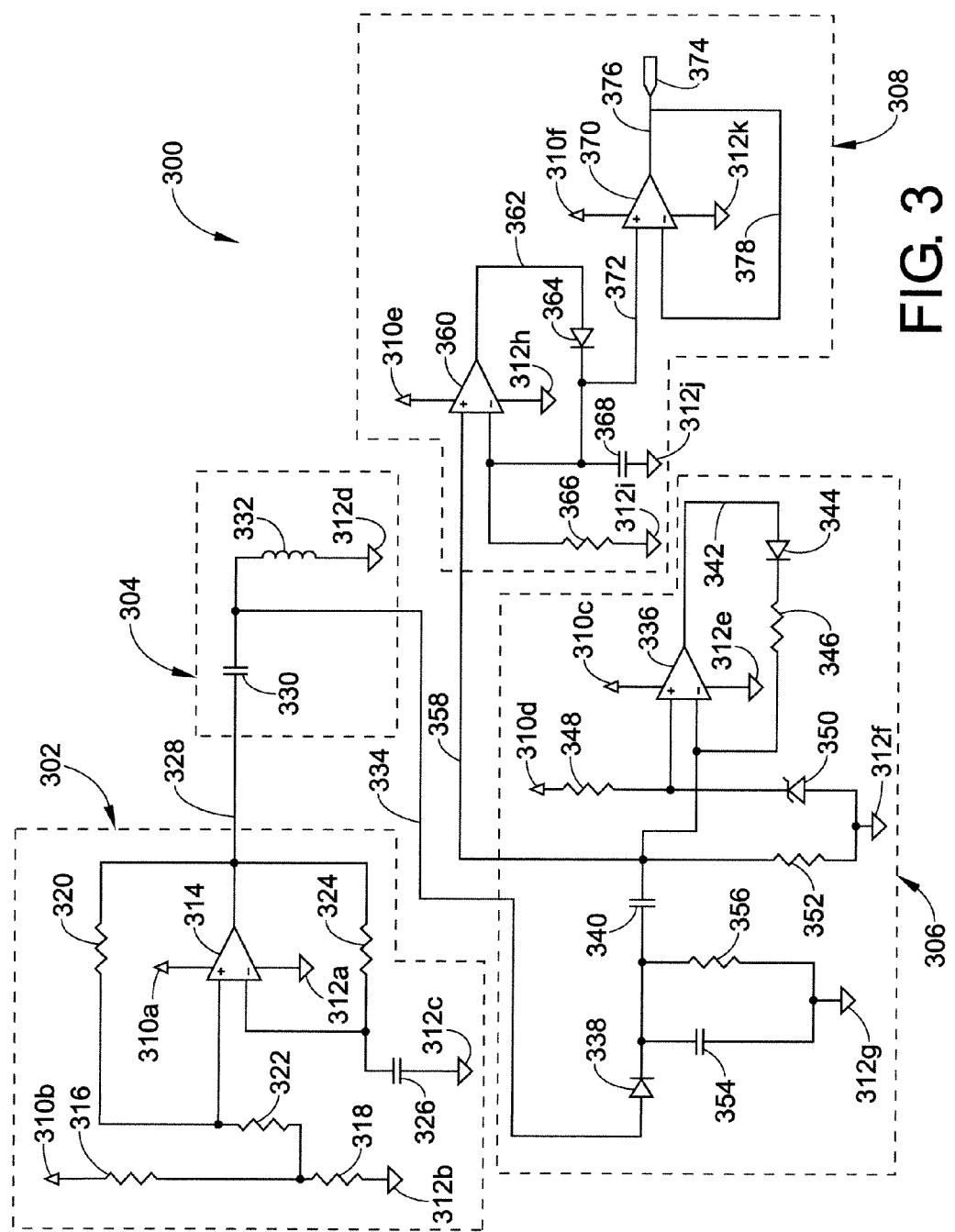
FIG. 3 is a diagram of one embodiment of an electronic circuit operable as the transceiver in FIG. 1.

A diagram of one embodiment of a suitable electronic circuit 300 operable as a transceiver, such as transceiver 100, for example, is shown in FIG. 3 and includes a carrier wave generator circuit 302, an antenna circuit 304, a modulation detector circuit 306 and an amplifier circuit 308. It will be appreciated that circuit 302 generally corresponds to generators 102 and 202 shown in FIGS. 1 and 2, and that circuits 304, 306 and 308 similarly correspond to antennae 104 and 204, modulation detectors 106 and 206 and amplifier 108, respectively. It will be additionally appreciated that A/D converter 208 and micro-controller 210 are of a typical construction well known to the skilled artisan and that one of ordinary skill in the art could electrically connect A/D converter 208 to modulation detector 206 even though no schematic illustration thereof is provided. It will be further appreciated that no power supply circuit corresponding to power supply 112 and 212 is provided in circuit 300. It is to be understood, however, that circuit 300 could alternately include a power supply circuit, even when the primary power supply includes the attendant conditioning and regulating circuitry, to ensure that the incoming electrical power is conditioned and regulated as desired. Furthermore, it will be recognized by the skilled artisan that circuit 300 can be formed as an integrated circuit on a unitary substrate, such as on a silicon wafer, for example, or alternately can be formed from discrete components in any suitable manner of implementation and/or using any suitable circuit fabrication techniques.

As shown in FIG. 3, circuit 300 includes a variety to traditional electrical components, including, without limitation, resistors, capacitors, diodes, operational amps, and inductors. It will be appreciated that these components are of substantially standard construction and are commonly available, unless otherwise noted. Additionally, various portions of circuit 300 connect to a positive terminal of a power supply (not shown) or power supply circuit (not shown) at one or more common points. The portions of circuit 300 that are so connected are generally indicated throughout the circuit diagram by terminal arrows 310. Similarly, various portions of the circuit are connected to a common ground, and these portions are shown generally by terminal arrows 312.

As mentioned above, circuit 300 includes a plurality of operational amplifiers (op-amps). It will be well understood by the skilled artisan that the op-amps are represented schematically in FIG. 3 using a symbol having a traditional pin configuration. Even though the pins are not individually identified by an item number, each op-amp includes opposing supply voltage pins (SV pins), a positive input pin (PI pin), a negative input pin (NI pin) and an output pin (OT pin). One example of a suitable op-amp is available from Texas Instruments of Dallas, Tex. as part number LM248.

Wave generation circuit 302 includes an op-amp 314, resistors 316-324 and a capacitor 326. Op-amp 314 has SV pins connected at terminal arrows 310a and 312a. The OT pin is connected to a voltage divider formed between terminal arrows 310b and 312b by resistors 316 and 318. The OT pin is connected to the voltage divider through resistors 320 and 322 and forms a feedback loop due to the PI pin of op-amp 314 being connected between resistors 320 and 322. Additionally, the OT pin of the op-amp is connected to ground at terminal arrow 312c through resistor 324 and capacitor 326. A feedback loop is formed with the OT pin due to the connection of the NI pin of the op-amp between resistor 324 and capacitor 326.

An electrical carrier wave signal is output by the OT pin of op-amp 314 and communicated to antenna circuit 304 along lead 328. Antenna circuit 304 includes a capacitor 330 that is in electrical communication with ground at terminal arrow 312d through an inductor 332. The inductor is represented in FIG. 3 by a standard symbol. However, it is to be appreciated that tuning or optimizing of the antenna may be desirable and, in such situations, the inductor can be formed into a specific shape or arrangement, such as a square shape, for example. In one exemplary embodiment, inductor 332 is a coil of wire that is formed into a circular or loop shape.

Modulation detecting circuit 306 is in electrical communication with antenna circuit 304 through lead 334 that is connected between capacitor 330 and inductor 332. Lead 334 is in electrical communication with the NI pin of an op-amp 336 through a diode 338 and a capacitor 340. Op-amp 336 has SV pins connected at terminal arrows 310c and 312e. A feedback loop is formed between the OT and NI pins of op-amp 336 by a lead 342 connected through a diode 344 and a resistor 346. The PI pin of op-amp 336 is connected between terminal arrows 310d and 312f through resistor 348 and diode 350, respectively. Diode 350 is shown in FIG. 3 as being a zener diode. Additionally, terminal arrow 312f is connected to the NI pin of op-amp 336 via lead 334 through a resistor 352. Terminal arrow 312g is connected along lead 334 separately through each of capacitor 354 and resistor 356.

Amplifier circuit 308 is electrically connected to modulation detecting circuit 306 by lead 358. Amplifier circuit 308 includes a first op-amp 360, and lead 358 connects to the PI pin thereof from along lead 334 between the NI pin of op-amp 336 and capacitor 340. Op-amp 360 has SV pins connected at terminal arrows 310e and 312h. A feedback loop is formed by lead 362 connected between the OT and NI pins of op-amp 360. A diode 364 is connected along lead 362, and the NI pin of op-amp 360 is also connected to terminal arrow 312i through resistor 366 and to terminal arrow 312j through capacitor 368. The PI pin of a second op-amp 370 is connected to lead 362 between diode 364 and the NI pin of op-amp 360 through a lead 372. An output connector 374 is connected to the OT pin of op-amp 370 by an output lead 376. A feedback loop is formed using a lead 378 connecting between the NI pin and lead 376 from between the OT pin and output connector 374. It will be appreciated that output connector 374 generally acts as an interface for communications arrow 110 shown in FIG. 1. As such, connector 374 can be of any suitable type, kind and/or configuration.

Figure 4:
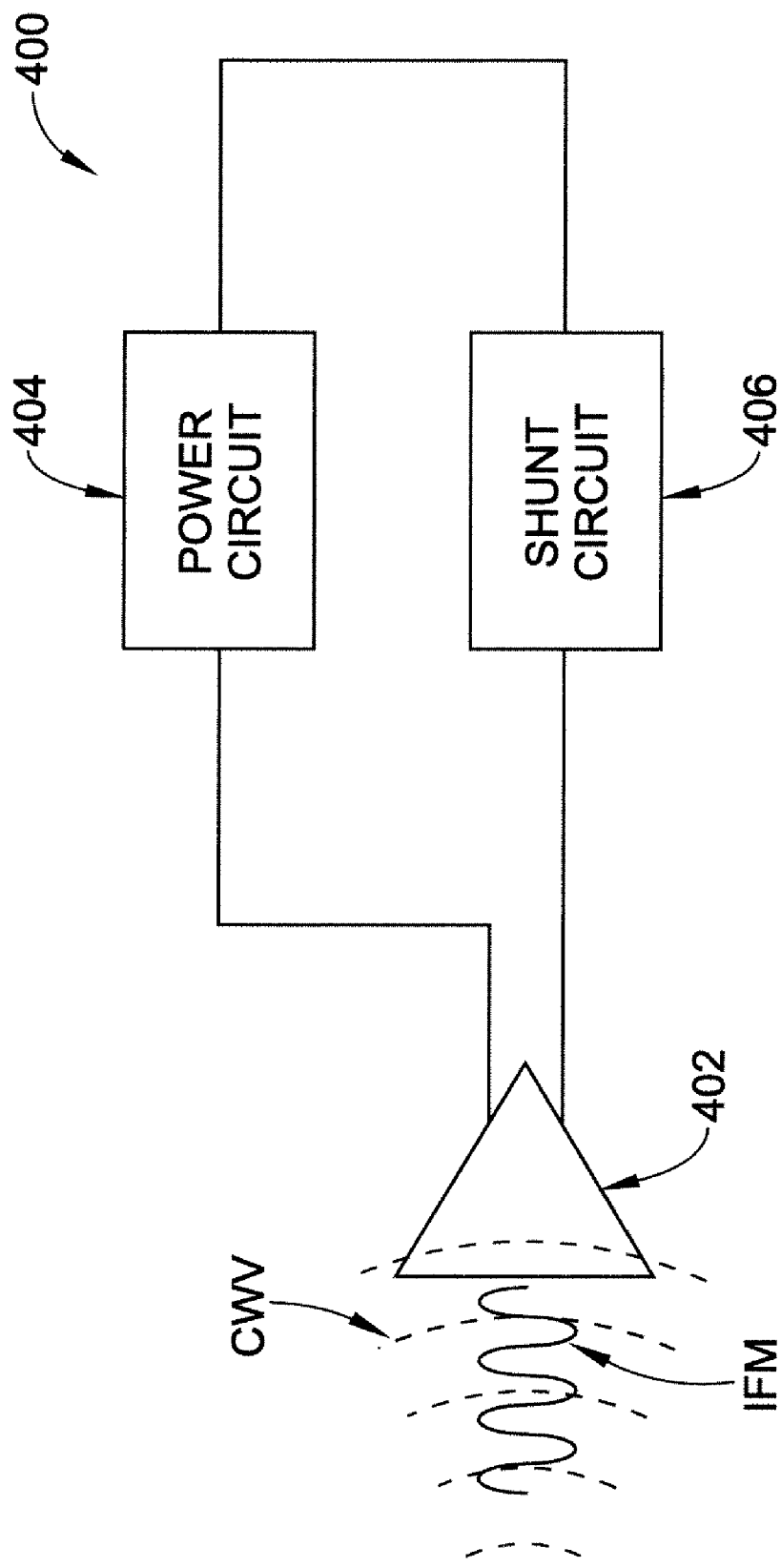
FIG. 4 schematically illustrates one embodiment of a transponder in accordance with the present novel concept.

A transponder 400 is shown in FIG. 4 and includes an antenna 402, a power circuit 404 and a shunt circuit 406. Generally, transponder 400 will be spaced a distance from one of either transceiver 100 or 200 and operate in conjunction therewith. More specifically, antenna 402 is adapted to receive EM carrier wave CWV broadcast by the antenna of the transceiver. The EM carrier wave induces an electrical output across or along the antenna. This electrical output is communicated to power circuit 404, which collects the electrical output and periodically energizes shunt circuit 406. When energized, the shunt circuit shorts antenna 402. This causes a change in the electromagnetic properties of antenna 402, such as substantially reducing the inductance of the antenna, for example. The change in the electromagnetic properties of antenna 402 induces a corresponding change across or along the antenna of the corresponding transceiver, such as transceiver 100 or 200, for example. It is this change across or along the antenna of the corresponding transceiver that is detected by the associated modulation detector of the transceiver, such as modulation detector 106 or 206, for example.

In one exemplary embodiment, antenna 402 of transponder 400 includes an inductive element (not shown). It is across or along this inductive element that the EM carrier wave induces the electrical output which is transmitted to power circuit 404. The electrical output, which includes an electrical potential and/or an electrical current, accumulates within power circuit 404 which, in turn, transmits an electrical energy pulse to shunt circuit 406 once a certain, predetermined quantity of electrical energy has accumulated within the power circuit. The electrical energy pulse causes shunt circuit 406 to form an electrical short across the inductive element of antenna 402. The short across the inductive element reduces the inductance thereof to about zero. One skilled in the art will recognize that this will cause a corresponding change along or across the inductive element of the antenna in the associated transceiver, as the two elements act as a loosely coupled transformer. It is this corresponding change that is monitored by the modulation detector. Such an induced field modulation is indicated generally by sine wave IFM in FIG. 4.

Figure 5:
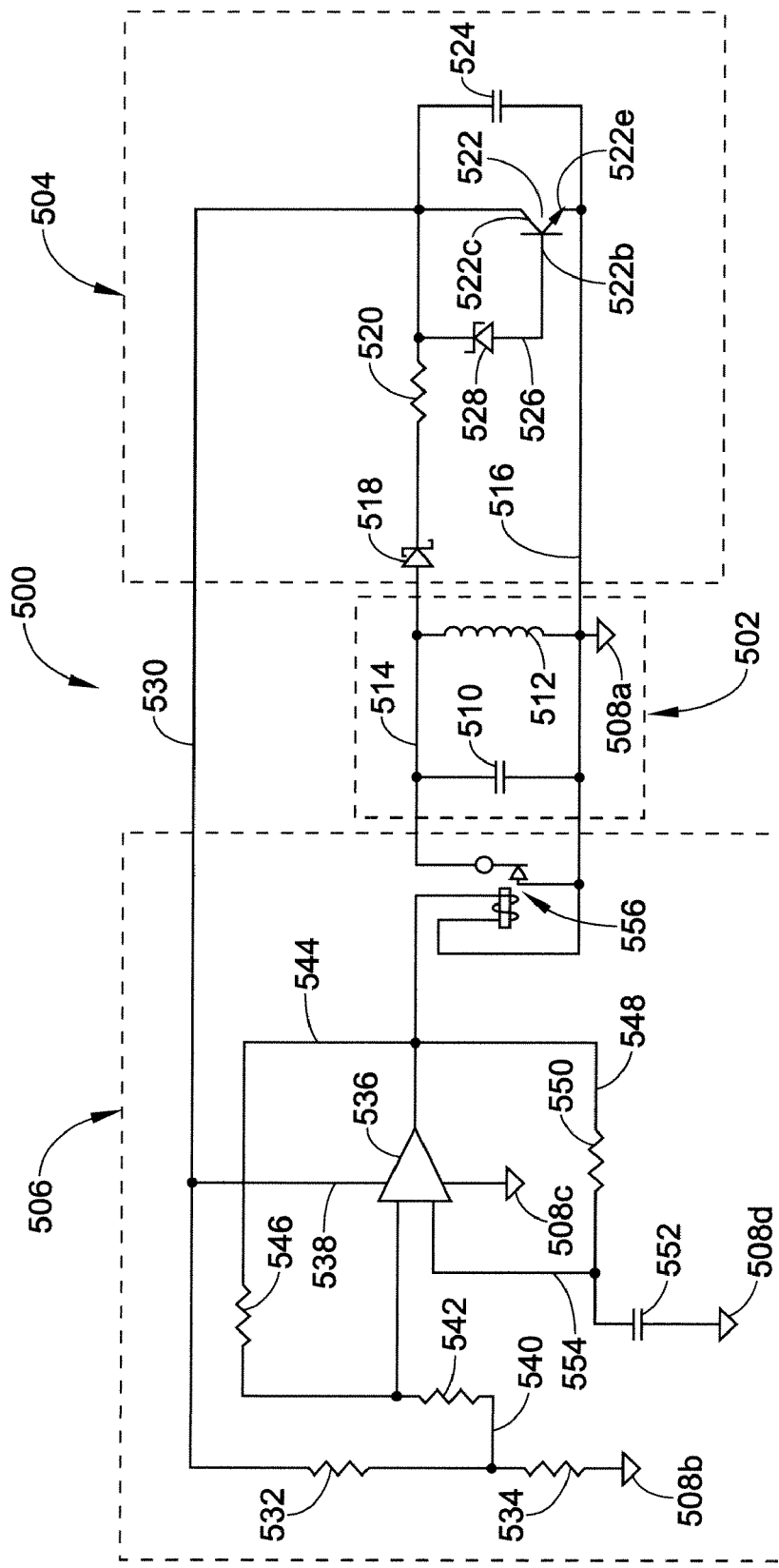
FIG. 5 is a diagram of one embodiment of an electronic circuit operable as the transponder in FIG. 4.

A diagram of one embodiment of a suitable electronic circuit 500 operable as transponder 400 is shown in FIG. 5, and includes an antenna circuit 502, a power circuit 504 and a shunt circuit 506. Generally, antenna circuit 502 corresponds to antenna 402 shown in FIG. 4. Similarly, power circuit 504 corresponds to circuit 404 and shunt circuit 506 corresponds to circuit 406. As discussed above, it will be recognized by the skilled artisan that circuit 500 includes a variety to traditional electrical components, including, without limitation, resistors, capacitors, diodes, operational amps, and inductors. It will be appreciated that these components are of substantially standard construction and are commonly available, unless otherwise noted. Additionally, circuit 500 can be formed as an integrated circuit on a unitary substrate, such as on a silicon wafer, for example, or alternately can be formed from discrete components in any suitable manner of implementation and/or using any suitable circuit fabrication techniques. What's more, various portions of circuit 500 connect to a common ground, and these portions are shown generally by terminal arrow 508.

Antenna circuit 502 includes a capacitor 510 and an inductor 512 connected in parallel between leads 514 and 516, the latter of which is connected to terminal arrow 508a adjacent inductor 512. The inductor is represented in FIG. 5 by a standard symbol. However, it is to be appreciated that tuning or optimizing of the antenna may be desirable to cause the same to be cooperable with inductor 332 of antenna circuit 304, for example. In such case, the inductor can be formed into a specific shape or arrangement, such as a coil of wire that is formed into a square, circular or loop shape, for example.

Power circuit 504 is connected to antenna circuit 502 through leads 514 and 516. A diode 518 and a resistor 520 are connected in series along lead 514. A transistor 522 and a capacitor 524 are connected in parallel between leads 514 and 516. The collector terminal 522c of transistor 522 is connected along lead 514 and the emitter terminal 522e of the transistor is connected along lead 516. A lead 526 connects the base terminal 522b of transistor 522 to lead 514 through a diode 528. In one exemplary embodiment, diode 518 is a Schottky diode and transistor 522 is a standard n-p-n transistor, as are well known by those of skill in the art.

Shunt circuit 506 is connected to power circuit 504 by lead 530, which extends from along lead 514 at about collector terminal 522c. Lead 530 acts as the upper leg of a voltage divider formed by resistors 532 and 534, which are connected between lead 530 and terminal arrow 508b. The shunt circuit also includes an op-amp 536. One SV pin of the op-amp is connected to a lead 530 through lead 538 and the other SV pin is connected to a terminal arrow 508c. A lead 540 connects from between resistors 532 and 534 to the PI pin of op-amp 536 through a resistor 542 connected therebetween. A feedback loop is formed between the OT and PI pins of op-amp 536 by a lead 544, which form the connection through a resistor 546. The OT pin of op-amp 536 is also connected to a terminal arrow 508d by a lead 548, which connects through resistor 550 and capacitor 552. The NI pin of the op-amp is connected to lead 548 from between resistor 550 and capacitor 552 thereon by a lead 554. A relay 556 is shown in FIG. 5 as being connected between the OT pin of op-amp 536 and leads 514 and 516 adjacent capacitor 510, opposite inductor 512. It will be appreciated that any suitable switching-type device can be used as an alternative to relay 556, such as a field-effect transistor (FET), for example.

Transponder antenna 502 is introduced into the transceiver RF field which causes a voltage to be introduced across antenna 502. This voltage passes thru diode 518 to power supply circuit 504, which regulates the voltage on lead 530 for proper operation of shunt circuit 506. Resisters 532 and 534 divide the voltage from lead 530 to be compared to the voltage at the NI pin from along lead 554. Resistor 550 and capacitor 552 control the rate of voltage increase at the NI pin along lead 554. Once the voltage along lead 554 is increased above the voltage at the PI pin taken from between resistors 546 and 542, the output at the OT pin of op-amp 536 will turn on. In turn, this will cause the relay 556 (or another suitable device such as a FET, for example) to short to ground which will short antenna 502. The shorting of the antenna will pull down the voltage at the transceiver to produce a measurable change to get distance.

Figure 6:
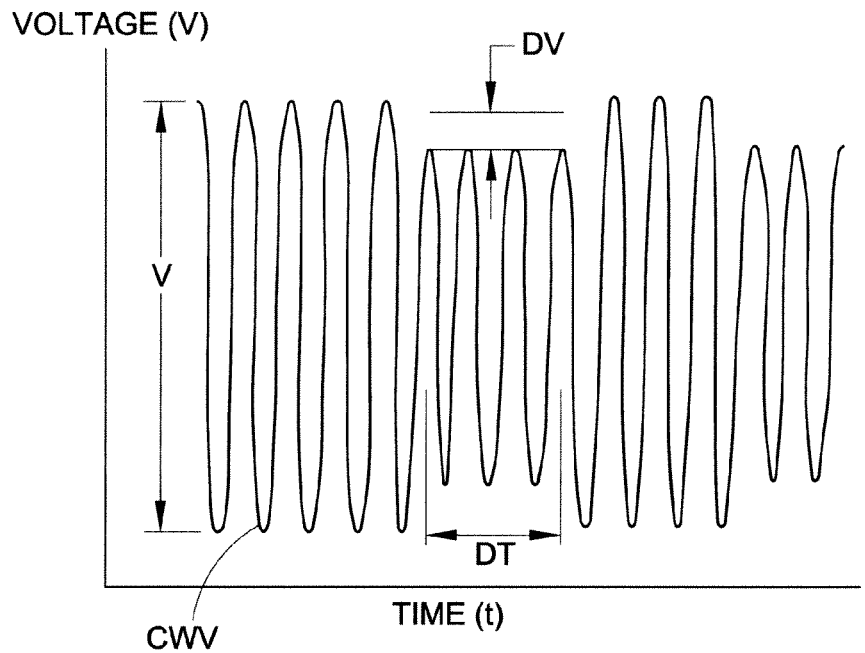
FIG. 6 illustrates an exemplary electromagnetic carrier wave having a modulated wave portion.

FIG. 6 illustrates one exemplary form of modulation of an EM carrier wave CWV having a standard sine waveform and an initial amplitude represented by voltage V. The carrier wave is modulated for an interval DT during which the amplitude thereof is reduced, as indicated by dimension DV. One example of a suitable range for voltage V is from about 50 to about 150 volts. One example of a corresponding range for the amplitude modulation indicated by dimension DV is from about 10 to about 1000 millivolts. The amplitude modulation can occur for any suitable duration or interval DT, such as from about 0.1 to about 5 milliseconds, for example. As indicated above, carrier wave CWV can have any suitable frequency, such as from about 100 kHz to about 14 MHz, for example. Such modulation is commonly referred to as backscattering modulation by those of skill in the art, and is useful for communicating between a transponder and a transceiver.

One example of a well known use of backscattering modulation is found in the area of radio frequency identification (RFID) systems. It will be appreciated, however, that the present novel concept differs significantly from a traditional RFID application. In particular, traditional RFID systems are used to transfer data that is encoded within a disposable tag. The tag associated with an object and typically the data includes one or more details specific to that object. Typically, RFID systems have no interest in determining the distance of the tag from other components of the system. The primary interest these RFID systems is reading the data encoded within the tag.

Figure 7:
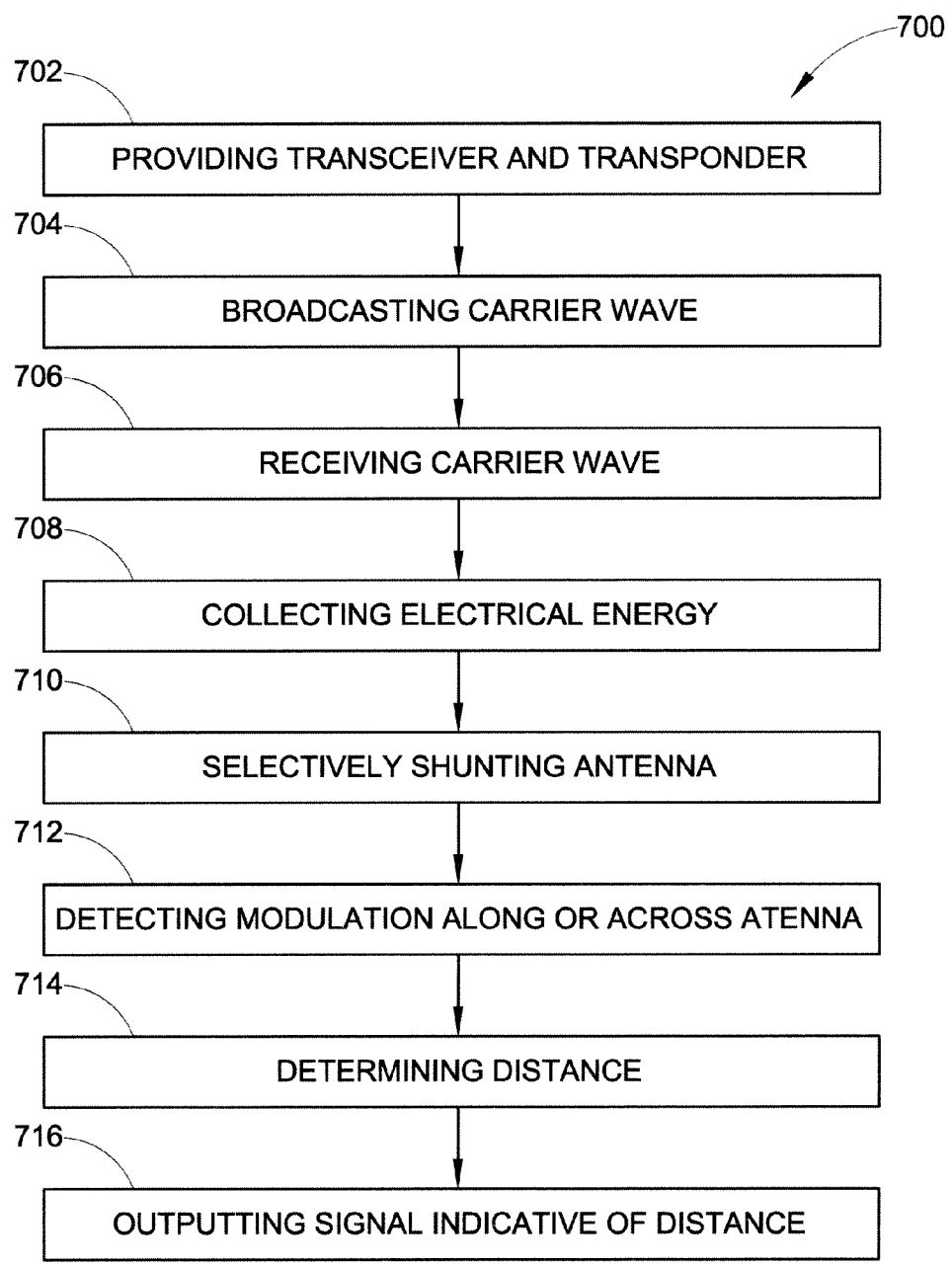
FIG. 7 is a flowchart illustrating steps of one method of indicating a distance in accordance with the present novel concept.

One exemplary method 700 of operation is shown in FIG. 7, and includes a first step 702 of providing a transceiver and a transponder, such as transceiver 100 or 200 and transponder 400, for example, in spaced relation to one another. Another step 704 includes broadcasting an EM carrier wave, such as carrier wave CWV, for example, from the antenna of the transceiver toward the antenna of the transponder. Another step 706 includes receiving the carrier wave at or along the antenna of the transponder. It is well understood by skilled artisans that electrical energy is generated along and/or across an inductor due to the reception and influence of an EM wave. Here, an optional step 708 includes collecting electrical energy generated along and/or across the antenna of the transponder due to the reception of the EM carrier wave. Another step 710 includes selectively shunting the antenna of the transponder and thereby causing the antenna of the transceiver to experience a modulation of one or more of its electrical properties, such as a momentary voltage drop, for example. A further step 712 includes detecting a modulation of an electrical property along or across the antenna. Another step 714 includes determining a distance between the transceiver and the transponder based at least in part upon the modulation of the electrical property in step 712. Still another step 716 includes outputting a signal indicative of the distance determined in step 714.

Figure 8:
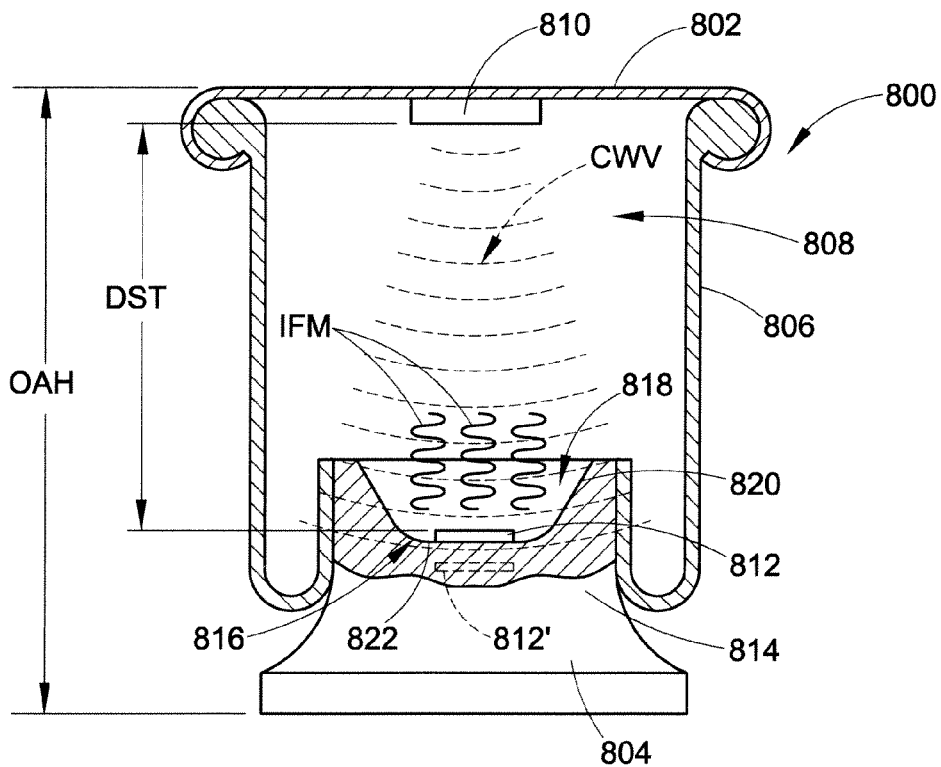
FIG. 8 is a side view, in partial cross section, of a fluid suspension member with a height indicating system in accordance with the present novel concept supported thereon.

One example of an application utilizing the present novel concept on and in association with a fluid suspension member 800 is shown in FIG. 8. The fluid suspension member is, more specifically, shown as being an air spring having a traditional piston and rolling lobe construction. It is to be distinctly understood, however, that a fluid suspension member of any suitable type, style, kind and/or configuration can be used without departing from the present novel concept. Fluid suspension member 800 includes a first end member, such as a top plate 802, for example, a second end member, such as a piston 804, for example, in spaced relation to the first end member, and a flexible member, such as flexible sleeve 806, for example, supported therebetween to substantially define an inner volume, such as fluid chamber 808, for example.

A transceiver 810 is supported on top plate 802 within fluid chamber 808 and a transponder 812 is supported on piston 804 in spaced relation to the transceiver. Piston 804 includes an outer peripheral wall 814 along which flexible sleeve 806 is displaced and a central inner wall 816. The inner wall is shown in FIG. 8 as being substantially concave or dish-shaped and forms an inner recess 818. Inner wall 816 has a side wall portion 820 and a bottom wall portion 822 upon which transponder 812 is secured. Transponder 812 can be secured on inner wall 816 in any suitable manner, such as by adhesive or using a mechanical fastener, for example. Alternately, transponder 812 can be molded or otherwise formed into inner wall 816 as indicated by transponder 812'. It will be appreciated that transceiver 810 is generally representative of any suitable transceiver, such as any of the various transceivers disclosed herein, including without limitation transceivers 100 and 200, for example. Similarly, transponder 812 is generally representative of any suitable transponder, such as the various transponders disclosed herein, including without limitation transponder 400, for example.

Once EM carrier wave CWV is broadcast and received by transponder 812, electrical energy generated along and/or across an antenna, such as in antenna circuit 402 of transponder 400, for example, acts to at least periodically power the transponder, such as has been described with regard to power circuit 404, for example. Alternately, the electrical energy could be provided by a battery or other suitable power source. Once transponder 812 is energized, a shunt circuit, such shunt circuit 406 of transponder 400, for example, periodically shunts the antenna of transponder 812 which causes the antenna of transceiver 810, such as in antenna 104 or 204, for example, to experience a modulation. The interrelationship between the antennae of the transponder and transceiver has been discussed above and is, for illustrative purposes only, generally represented by sine waves IFM in FIG. 8. One or more characteristics or properties of the modulation will directly correspond or otherwise be mathematically related to the distance between the transponder and the transceiver as is well understood by those of skill in the art. As such, the transceiver detects the modulation and outputs a signal indicative of the distance between the transceiver and the transponder. It will be fully understood, however, that modes of operation other than that described in the foregoing can be used without departing from the present novel concept.

Figure 9:
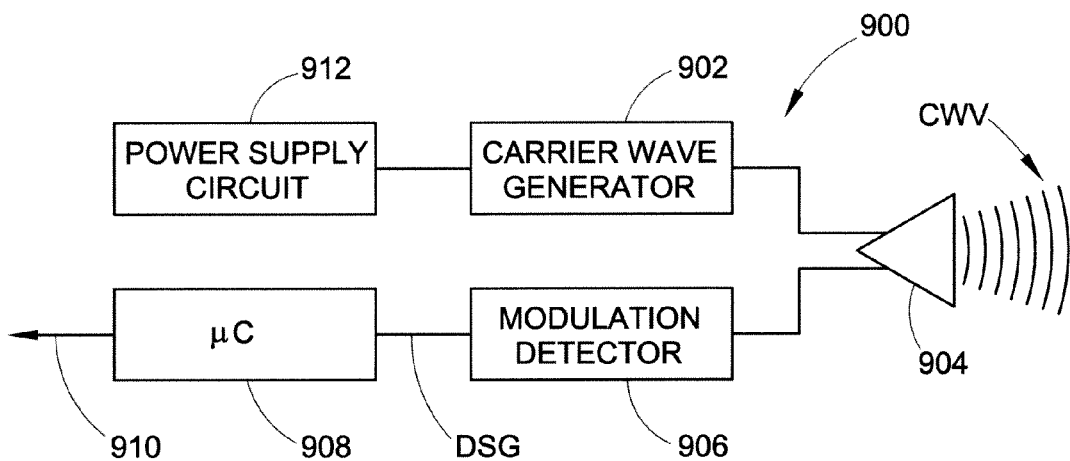
FIG. 9 schematically illustrates another alternate embodiment of a transceiver in accordance with the present novel concept.

Another alternate embodiment of a transceiver 900 is schematically shown in FIG. 9. Transceiver 900 includes a carrier wave generator 902 that is in electrical communication with an antenna 904. Like wave generators 102 and 202 discussed above, wave generator 902 is adapted to output an electrical carrier wave signal to the antenna which in turn broadcasts a corresponding carrier wave CWV. A modulation detector 906 is electrically connected to antenna 904 generally opposite wave generator 902. Modulation detector 906 is similar to detectors 106 and 206 discussed above in that detector 906 is adapted to detect a modulation of an electrical characteristic or property along or across the antenna. Modulation detector 906 differs from detectors 106 and 206, however, in that detector 906 is adapted to output a digital signal DSG corresponding to the modulation along or across antenna circuit 904, rather than outputting an analog signal having a property, such as a voltage or current level, in corresponding relation to the magnitude of the modulation as in detectors 106 and 206. Digital signal DSG is communicated to a suitable digital device, such as a digital signal processor or a micro-controller 908, for example, which is operable to convert, decode and/or analyze digital signal DSG and output a corresponding signal indicative of a distance between the transceiver and an associated transponder. The signal output by micro-controller 908 is communicated to a downstream system or device, as indicated by arrow 910.

Additionally, a power supply circuit 912 is shown in FIG. 9 in electrical communication with wave generator 902. It will be appreciated that in other embodiments, power supply circuit 912 can also or alternately provide electrical power to one or more of the other components of transceiver 900. As discussed above with regard to power supply circuit 112 of transceiver 100 in FIG. 1, for example, circuit 912 can take any suitable form, shape or configuration either integral with or separate from the other components of transceiver 900. One example of a suitable transceiver is available from Microchip Technologies, Inc. of Chandler, Ariz. under the designation or item number MCRF 200.

Figure 10:
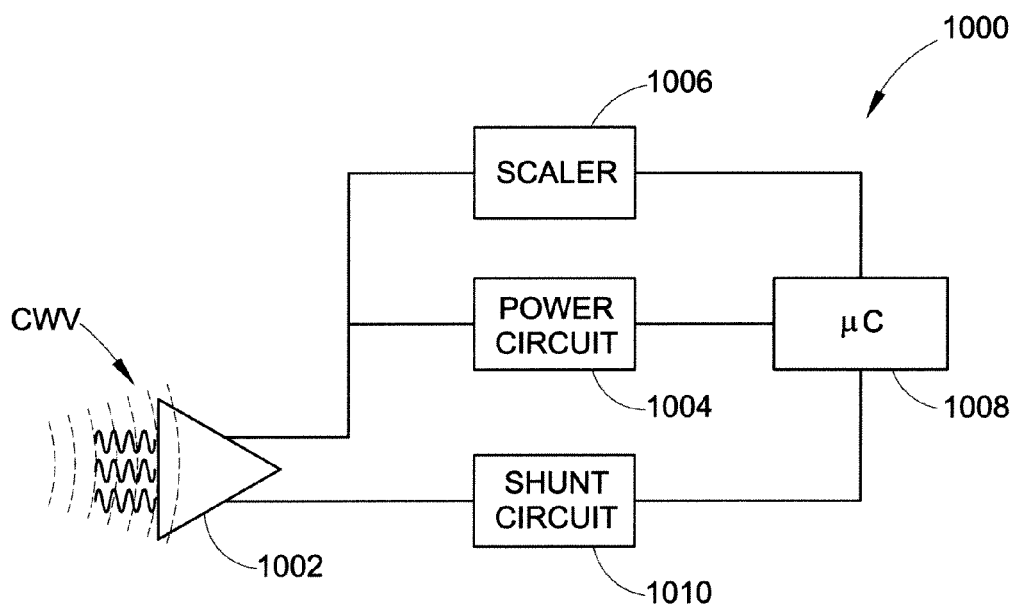
FIG. 10 schematically illustrates an alternate embodiment a transponder in accordance with the present novel concept.

One example of a transponder suitable for use in association with transceiver 900 is shown in FIG. 10 as transponder 1000. In general, transponder 1000 operates in combination with a transceiver, such a transceiver 900, to determine a distance therebetween and output a signal indicative of this distance, as has been described in detail above. In the foregoing embodiments, however, the transceiver, such as transceiver 100 or 200, determines the distance between the two components based upon the magnitude of modulation along or across the antenna thereof. The primary operation of the associated transponder, such as transponder 400, is to effectuate or cause this modulation. Here, the operation of transceiver 900 and transponder 1000 is based upon the present novel concept and utilizes the same underlying principles of operation discussed above with regard to the other embodiments. However, transponder 1000 is operable to at least partially determine the distance between the two components, such as by using a digital processing device, for example. Accordingly, digital data corresponding to the distance and/or other data, such as an identification code or number, for example, will be communicated at least from the transponder to the transceiver. Such a data transmission, communication and/or exchange can take any suitable form, including without limitation direct data transmissions and encoded data transmissions, as will be discussed hereinafter.

It will be appreciated from FIGS. 10-14 that this construction is different than the foregoing embodiments in structure and operation, as will be discussed in detail hereinafter. Transponder 1000 includes an antenna 1002 adapted to receive EM carrier wave CWV, such as may be broadcast by antenna 904 of transceiver 900, for example. As described in detail above, carrier wave CWV induces an electrical energy output along and/or across antenna 1002. The electrical energy output is communicated to a power circuit 1004 and a scaler 1006, which are in electrical communication with the antenna. Generally, the power circuit collects at least a portion of the electrical energy and periodically energizes one or more components of the transponder, as has been described above.

Scaler 1006 is operative to reduce or otherwise scale down one or more electrical characteristics or properties, such as a voltage or current level, for example, of the signal from antenna 1002 that is passing therethrough. Scaler 1006 will preferably condition the signal from antenna 1002 for receipt and usage by a digital signal processor or micro-controller 1008, which is in electrical communication with the scaler and power circuit. Preferably, however, this reduction or scaling down of the electrical signal is performed such that a relationship of the scaled-down signal is maintained with respect to the original signal from the antenna. In this way, micro-controller 1008 can be used to determine a distance between the associated transceiver, such as transceiver 900, for example, and transponder 1000. As mentioned above, it is understood by those of skill in the art that one or more properties of EM waves vary with distance of travel according to well known relationships therebetween.

As indicated above, power circuit 1004 periodically energizes one or more circuits or components of the transponder. One such component energized by the power circuit is micro-controller 1008, which determines a magnitude or other electrical characteristic or property of the signal output by scaler 1006. This magnitude or other property will have a direct or other mathematical relation to the distance between that transceiver and the transponder. Thus, the micro-controller can determine the actual distance value and then operate to communicate the same back to the transceiver. Alternately, the micro-controller can simply operate to communicate the magnitude or other property of the signal output by the scaler without specifically determining an actual distance value. In this alternate example, once the signal from the scaler has been communicated back to the transceiver, the micro-controller therein can convert or calculate the actual distance value.

Once micro-controller 1008 is energized and has determined a characteristic or property of the signal output by scaler 1006, the micro-controller operates to selectively activate shunt circuit 1010 to communicate data, preferably including without limitation data corresponding to the distance value or the signal output by the scaler, back to the associated transceiver. When activated, shunt circuit 1010 electrically shorts antenna 1002 which, in turn, induces a modulation across or along the antenna of the corresponding transceiver, such as antenna 904 of transceiver 900, for example. The interrelationship between the antennae of the transceiver and transponder has been discussed above in significant detail, and is generally indicated by sine waves IFM in FIG. 10.

Figure 11:
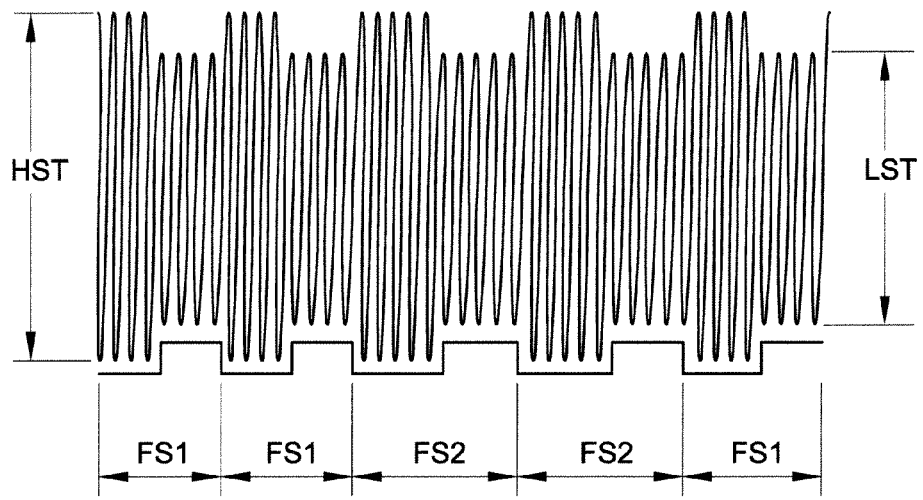
FIG. 11 illustrates an electromagnetic carrier wave modulated using frequency-shift keying.
Figure 12:
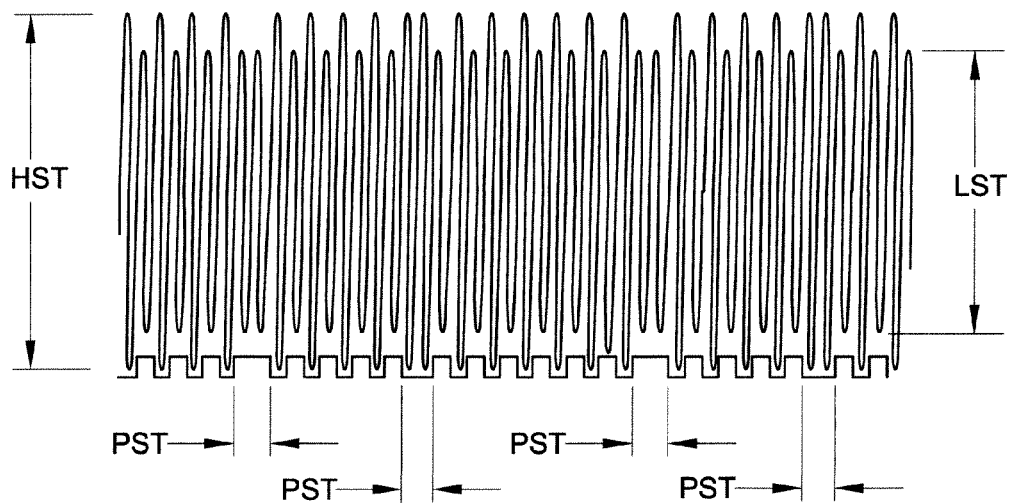
FIG. 12 illustrates an electromagnetic carrier wave modulated using phase-shift keying.

In one exemplary embodiment, either the signal value or the actual distance value is communicated as data from the transponder back to the transceiver by the operation of micro-controller 1008 selectively actuating shunt circuit 1010. The data communication from the transponder to the transceiver can be of any suitable form or type, such as a binary data stream directly corresponding to either the signal or distance values. Alternately, the digital communication can be encoded to minimize losses due to interference, for example. A wide variety of encoding arrangements are known and can be used, such as those using frequency-shift keying (FSK) and phase-shift keying (PSK), for example. Both FSK and PSK are well known by those of skill in the art. An example of a carrier wave CWV modulated using FSK is shown in FIG. 11, and includes wave CWV modulated between a high amplitude state HST and a low amplitude state LST. The modulation can act to transmit data in any suitable manner, such as by having an 8-cycle shift FS1 correspond to a zero (0) value and a 10-cycle shift FS2 correspond to a one (1) value, for example. In this way, a binary data stream can be transmitted between the transponder and the transceiver. An example of a carrier wave CWV modulated using PSK is shown in FIG. 12 and also includes carrier wave CWV being modulated between states HST and LST. As is apparent from FIG. 12, the frequency with which the carrier wave is shifted remains constant, such as at one cycle at HST, the next cycle at LST, the next cycle after that at HST, etc. To transmit data, however, the phase can be shifted such that two cycles occur at the same state. In one example, each phase shift PST represents a zero (0) in the binary data stream. In another example, each shift PST represents a data value changes (from 0 to 1 or from 1 to 0). It will be understood, however, that any other suitable modulation and/or data transmission technique can alternately be used.

Figure 13:
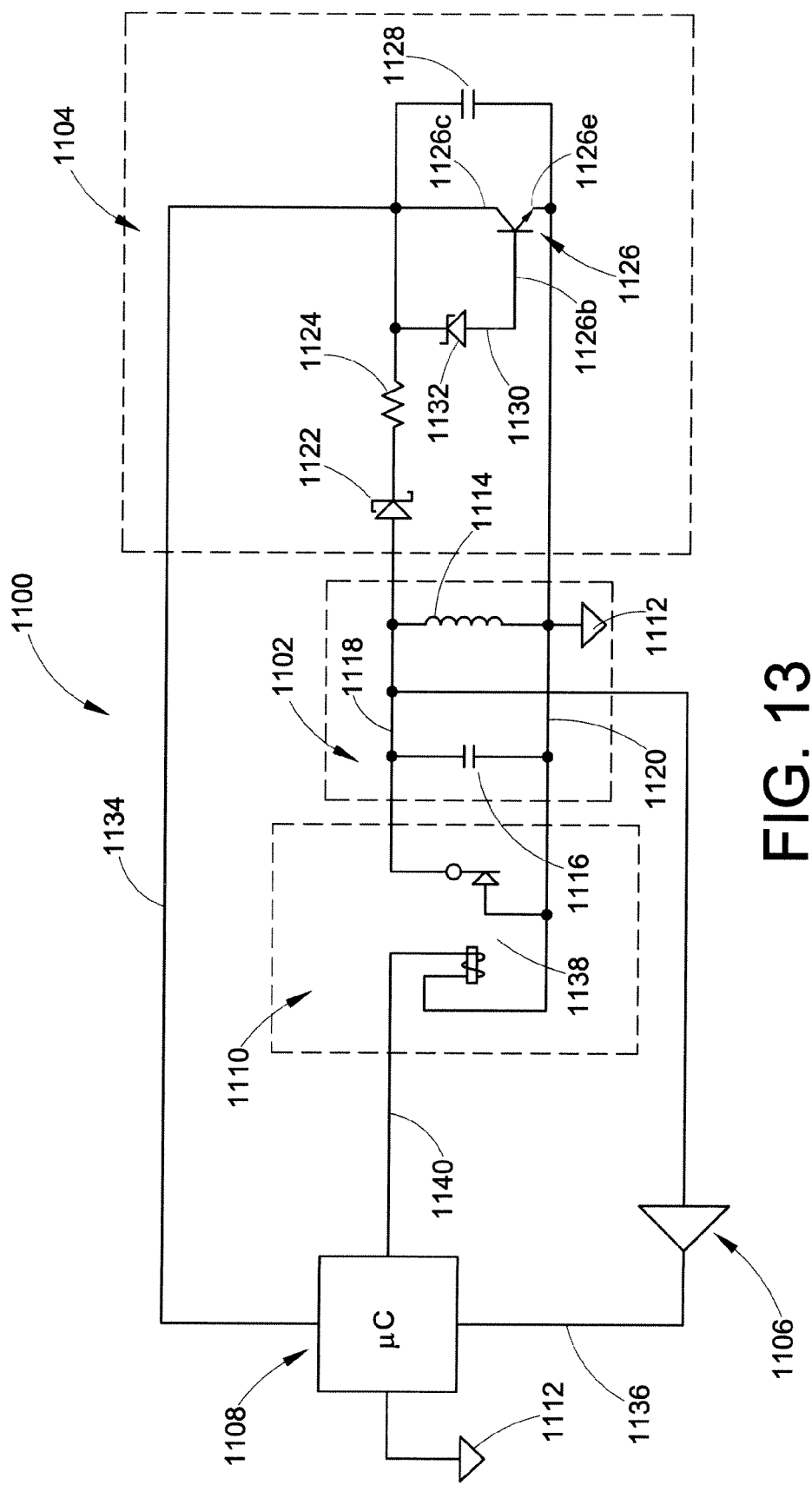
FIG. 13 schematically illustrates one embodiment of an electronic circuit operable as the transponder in FIG. 10.

A diagram of one embodiment of a circuit 1100 that is suitable for use as a transponder 1000 is shown in FIG. 13. The circuit includes an antenna circuit 1102, a power circuit 1104, a scaler 1106, a micro-controller 1108 and a shunt circuit 1110. Generally, antenna circuit 1102 corresponds to antenna 1002 shown in FIG. 10. Similarly, power circuit 1104 corresponds to circuit 1004, scaler 1106 corresponds to scaler 1006, micro-controller 1108 corresponds to micro-controller 1008 and shunt circuit 1110 corresponds to shunt circuit 1010.

As discussed above, it will be recognized by the skilled artisan that circuit 1100 includes a variety to traditional electrical components, including, without limitation, resistors, capacitors, diodes, inductors, transistors and other well known components. It will be appreciated that these components are of substantially standard construction and are commonly available, unless otherwise noted. Additionally, circuit 1100 can be formed as an integrated circuit on a unitary substrate, such as on a silicon wafer, for example, or alternately can be formed from discrete components in any suitable manner of implementation and/or using any suitable circuit fabrication techniques. What's more, various portions of circuit 1100 connect to a common ground, and these portions are shown generally by terminal arrow 1112.

Antenna circuit 1102 includes an inductor 1114 and a capacitor 1116 connected in parallel between leads 1118 and 1120. Terminal arrow 1112 is connected along lead 1120 adjacent the inductor, which is represented in FIG. 13 by a standard symbol. However, it will be appreciated that tuning or optimizing of the antenna may be desirable to cause the same to be cooperable with another antenna such as antenna 904 of transceiver 900, for example. In such case, inductor 1114 can be formed into a specific shape or arrangement, such as a coil of wire that is formed into a square, circular or loop shape, for example.

Power circuit 1104 is connected to antenna circuit 1102 through leads 1118 and 1120. A diode 1122 and a resistor 1124 are connected in series along lead 1118. A transistor 1126 and a capacitor 1128 are connected in parallel between leads 1118 and 1120. The collector terminal 1126c of transistor 1126 is connected along lead 1118 and the emitter terminal 1126e of the transistor is connected along lead 1120. A lead 1130 connects the base terminal 1126b of transistor 1126 to lead 1118 through a diode 1132. In one exemplary embodiment, diode 1122 is a Schottky diode and transistor 1126 is a standard n-p-n transistor, as are well known by those of skill in the art.

Micro-controller 1108 is connected to power circuit 1104 through lead 1134 that connects with lead 1118 from between resistor 1124 and capacitor 1128 adjacent collector terminal 1126c. Additionally, micro-controller 1108 is in electrical connection with lead 1118 by lead 1136 through scaler 1106. Micro-controller 1108 can be of any suitable type or configuration. One example of a suitable micro-controller is available from Freescale Semiconductor, Inc. of Austin, Tex. under the designation or part number 68HC05L25. This micro-controller includes a processor, a memory and a clock. Additionally, scaler 1106 can take any suitable form or configuration.

Shunt circuit 1110 includes a relay 1138 connected between leads 1118 and 1120 of antenna circuit 1102 and lead 1140, which is in electrical communication with micro-controller 1108. It will be appreciated that any suitable switching-type device can be used as an alternative to relay 1138, such as a field-effect transistor (FET), for example.

Figure 14:
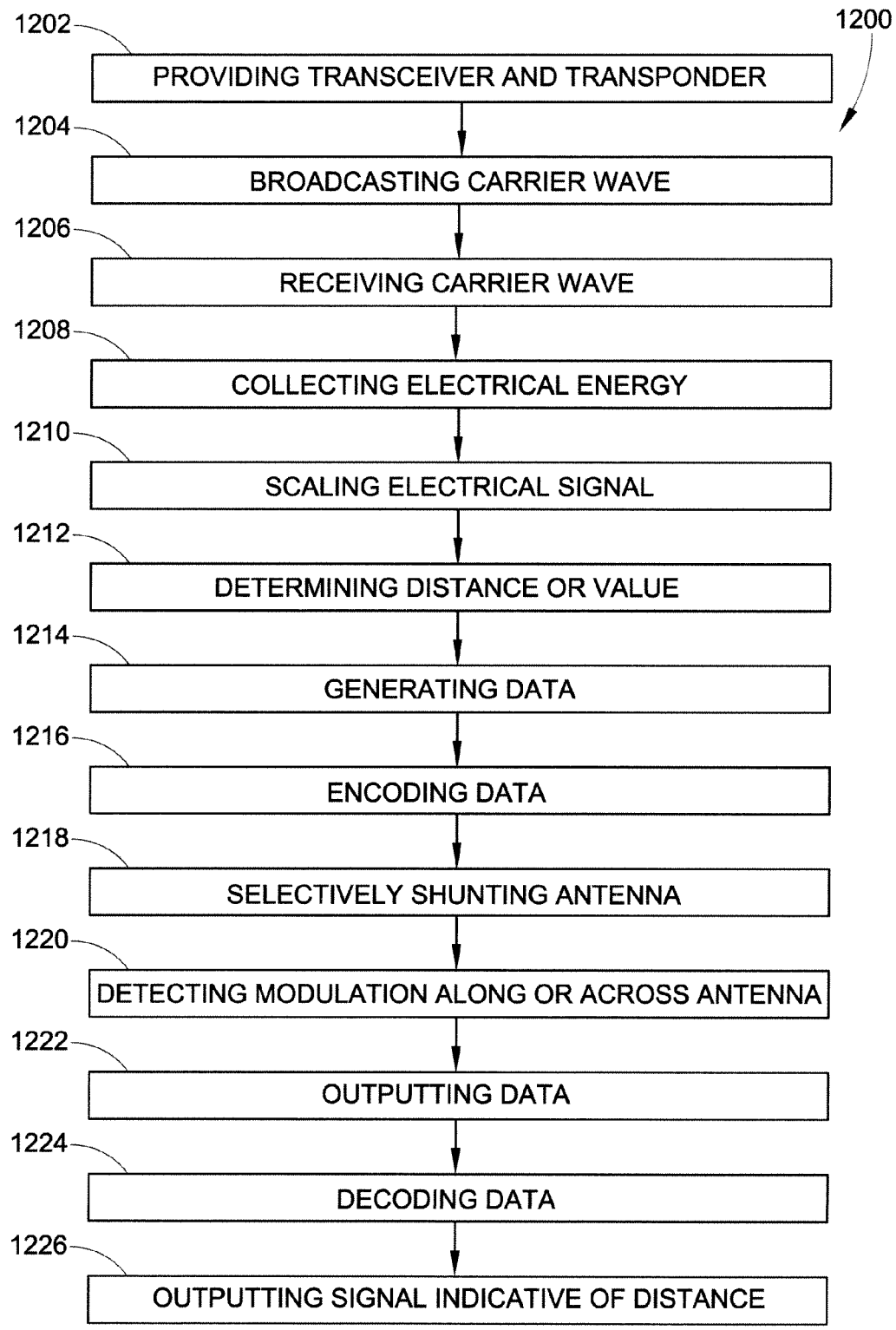
FIG. 14 is a flow chart illustrating steps of another method of indicating a distance in accordance with the present novel concept.

Another exemplary embodiment of a method 1200 of operation is shown in FIG. 14 and includes a step 1202 of providing a transceiver and a transponder, such as transceiver 900 and transponder 1000, for example, in spaced relation to one another. Another step 1204 includes broadcasting an EM carrier wave from an antenna of the transceiver toward the antenna of the transponder. Another step 1206 includes receiving the carrier wave at or along the antenna of the transponder. An optional step 1208 includes collecting electrical energy generated along and/or across the antenna of the transponder.

Another step 1210 of method 1200 includes scaling the electrical signal from the antenna of the transponder to a magnitude suitable for use by a processor or micro-controller. Still another step 1212 includes determining one of a distance and a value corresponding to the distance based upon the scaled electrical signal output. A further step 1214 includes generating data corresponding to one of the distance and the value corresponding to the distance. An optional step 1216 includes encoding the generated data. Still a further step 1218 includes selectively shunting the antenna of the transponder to modulate the antenna of the transceiver to communicate the data. Another step 1220 includes detecting the modulation of the antenna of the transceiver. Still another step 1222 includes outputting data corresponding to the detected modulation. A further optional step 1224 includes decoding the data in a manner cooperative with optional encoding step 1216. Still a further step 1226 includes outputting data or other digital signal indicative of the distance.

Figure 15:
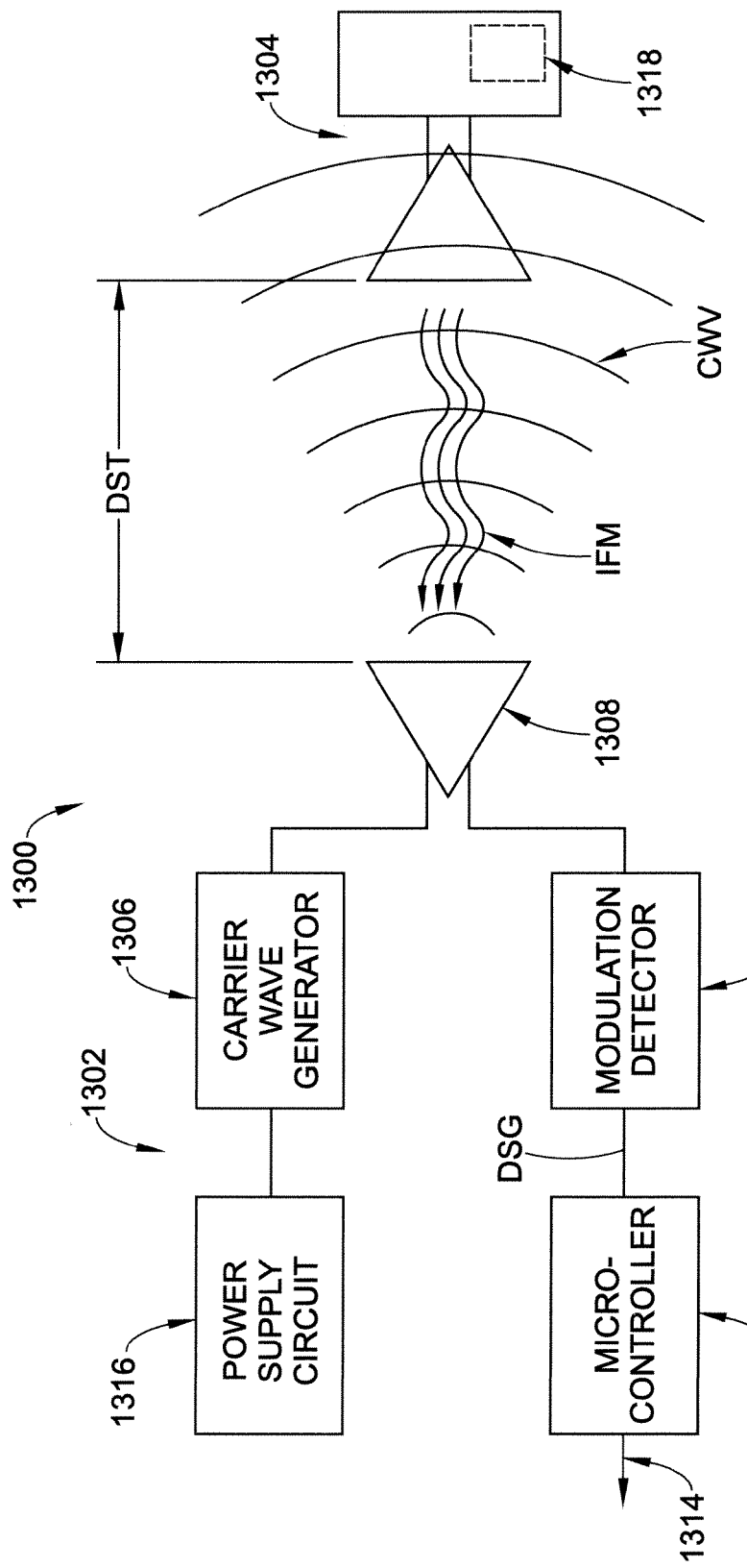
FIG. 15 schematically illustrates one embodiment of a sensing and communication system in accordance with the present novel concept.

FIG. 15 schematically illustrates one exemplary embodiment of a sensing and communication system 1300 in accordance with the present novel concept that includes a transceiver 1302 in use with a transponder 1304. The transceiver and transponder are spaced a distance from one another, as indicated by dimension DST. Transceiver 1302 is substantially similar to transceiver 900 shown in and discussed with regard to FIG. 9, and includes a carrier wave generator 1306 that is in electrical communication with an antenna 1308. Wave generator 1306 is adapted to output an electrical carrier wave signal to antenna 1308, which in turn broadcasts a corresponding carrier wave CWV. A modulation detector 1310 is electrically connected to antenna 1308 generally opposite wave generator 1306. Modulation detector 1310 is adapted to output a digital signal DSG corresponding to the modulation along or across antenna 1308. Digital signal DSG is communicated to a suitable digital device, such as a digital signal processor or micro-controller 1312, for example, which is operable to convert, decode and/or analyze digital signal DSG and output a corresponding signal into a downstream system or device, as indicated by arrow 1314. On example of a suitable transceiver is available from Microchip Technologies, Inc., of Chandler, Ariz., under the designation or item number MCRF 200.

Additionally, a power supply circuit 1316 is shown in FIG. 15 in electrical communication with carrier wave generator 1306. As discussed above with regard to power supply circuit 112 of transceiver 100 in FIG. 1, for example, power supply circuit 1316 can take any suitable form, shape or configuration either integral with or separate from the other components of transceiver 1302.

Transponder 1304 is shown in use with transceiver 1302 and receives carrier wave CWV therefrom, as has been discussed above with regard to other embodiments. Transponder 1304 differs from the other transponders discussed above in that a sensor 1318 is operatively associated with the transponder, which is operative to modulate carrier wave CWV as is generally indicated by sine waves IFM, as has been discussed above in detail. Transponder 1304 can operate to modulate carrier wave CWV in relation to distance DST, such as has been discussed above with regard to transponder 1000 in FIG. 10, for example. Additionally, or in the alternative, transponder 1304 can operate to modulate the carrier wave in response to an output signal from sensor 1318. As will be discussed in additional detail hereinafter, it is to be understood that transponder 1304 is capable of modulating carrier wave CWV in response to either distance DST, an output from any of one or more sensors, such as sensor 1318, for example, or any combination of distance and sensor outputs as may be desirable. Additionally, modulation of the carrier wave in response to distance DST and/or a sensor output signal can occur at any suitable operative frequency or duration, either regular or irregular intervals of operation.

Figure 16:
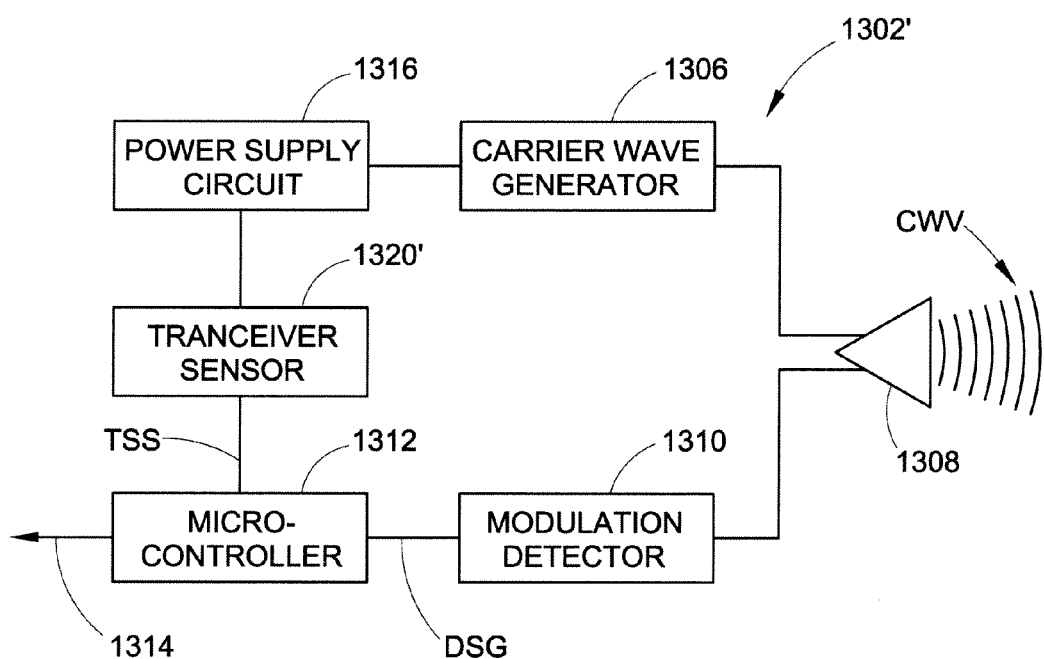
FIG. 16 schematically illustrates an alternate embodiment of the transceiver shown in FIG. 15.

An alternate embodiment of a transceiver 1302' is shown in FIG. 16, and is substantially similar to transceiver 1302 shown in FIG. 15. As such, like items are shown and described with like item numbers, and new or modified items are indicated by primed (') item numbers.

Transceiver 1302' includes carrier wave generator 1306 in communication with antenna 1308 for broadcasting carrier wave CWV. Modulation detector 1310 is in communication with antenna 1308 opposite generator 1306, and outputs digital signal DSG to a micro-controller 1312'. A power supply circuit 1316' is in communication with carrier wave generator 1306. Additionally, a transceiver sensor 1320' is in communication with power supply circuit 1316' and micro-controller 1312'. As such, sensor 1320' receives electrical energy from power supply circuit 1316' and outputs a transceiver sensor signal TSS to micro-controller 1312'. The micro-controller is operative to receive signals TSS and DSG and perform one or more suitable operations utilizing these signals. Micro-controller 1312' thereafter communicates with other downstream systems and/or devices, as indicated generally by arrow 1314.

Figure 17:
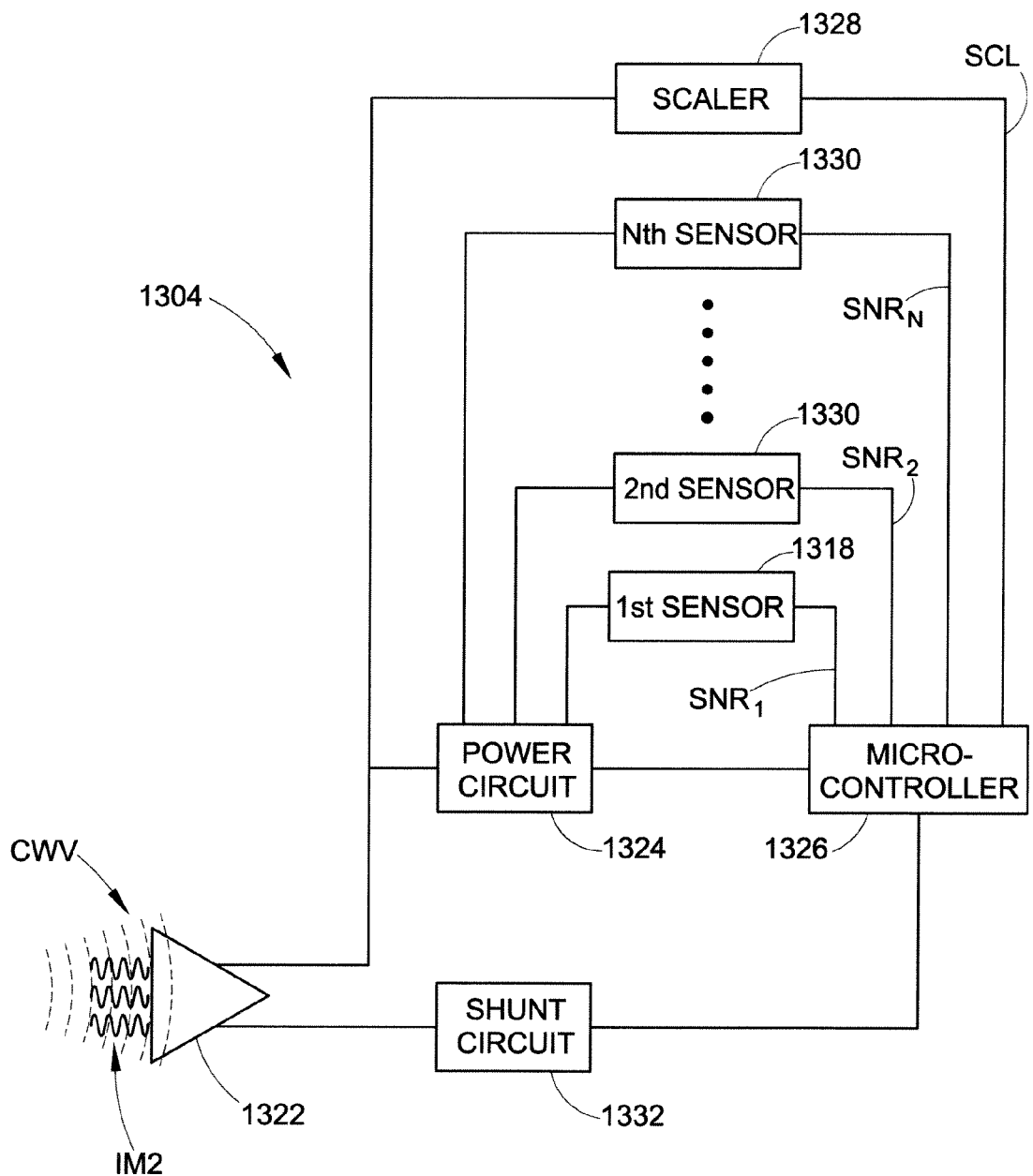
FIG. 17 schematically illustrates another alternate embodiment of a transponder in accordance with the present novel concept.

Transponder 1304 is schematically illustrated in FIG. 17, and includes an antenna 1322 suitable for receiving carrier wave CWV. A power circuit 1324 is in communication with antenna 1322 and is suitable for collecting electrical energy therefrom, as has been discussed above with regard to other embodiments. A micro-controller 1326 is in communication with power circuit 1324 and receives electrical energy therefrom. A scaler 1328 is in communication with antenna 1322 and micro-controller 1326, and is operative to generate a scaler output signal SCL that is representative one or more scaled electrical characteristics or properties, such as voltage or current level, for example, of the signal from antenna 1322.

Sensor 1318 is in communication with power circuit 1324 and micro-controller 1326. The sensor receives electrical energy from power circuit 1324 and outputs a sensor output signal SNR to micro-controller 1326. As such, sensor 1318 is powered by electrical energy from power circuit 1324 without the use of other external wires or leads supplying electrical power thereto. The wirelessly powered sensor generates sensor output signal SNR which is in turn communicated to micro-controller 1326. One or more additional sensors 1330 can optionally be used in operative association with transponder 1304 and, in one exemplary embodiment, can be powered by power circuit 1324 and output a suitable sensor output signal $SNR_2$ to $SNR_N$ to micro-controller 1326 in a manner similar to sensor 1318.

Sensor 1318 as well as sensors 1330, if provided, can be of any suitable type, kind, configuration and/or construction that is operable to output a signal indicative of the property or input being sensed. Exemplary sensors can include, without limitation, accelerometers, pressure transducers, and temperature probes or thermocouples. It will be appreciated that those of skill in the relevant arts will be capable of determining and selecting other suitable sensors and operatively associating the same with the corresponding transducer. In selecting an appropriate quantity and arrangement of sensors and selecting the specific sensors for use, one of skill in the art will recognize that the amount of electrical energy generated on and by the transducer for operating the electrical components thereof should be considered, and that it is desirable for the transducer to remain electrically powered by one or more wireless energy sources.

A shunt circuit 1332 is in electrical communication with micro-controller 1326 and antenna 1322. Shunt circuit 1332 is operative to vary the inductance of antenna 1322 due to selective activation thereof by micro-controller 1326. By selectively energizing shunt circuit 1332 and causing the corresponding changes in the inductance of antenna 1322, an induced modulation of carrier wave CWV can be caused, as indicated by sine waves IM2. In one exemplary embodiment, micro-controller 1326 selectively activates shunt circuit 1332 to induce modulation of carrier wave CWV in a pattern suitable for communicating data to a corresponding transceiver, such as transceiver 1302, for example. The pattern can be of any suitable type or kind, and take any suitable form or configuration, including direct transmission or encoded transmission, such as frequency-shift keying and phase-shift keying, discussed above. The data communicated by selectively shunting circuit 1332 is generated by micro-controller 1326 in response to scaler output signal SCL and additionally, or in the alternative, by sensor output signal SNR. Additional sensor output signals $SNR_2$ to $SNR_N$ can optionally be included in the data generation process if such additional sensors are operatively associated with the transponder.

Furthermore, it is to be distinctly understood that the data can be generated and/or communicated in any suitable form or manner, that the following examples are merely illustrative of suitable sensing and communication operation, and that any other suitable data generation and/or communication method could alternately be used. For example, each signal (e.g., scaler output signal SCL and sensor output signals $SNR_1$ to $SNR_N$) could be converted into individual messages having a predetermined number of bits or bytes, with each message including a signal source identifier and a corresponding signal value. As such, data from each sensor can be generated and communicated as frequently or infrequently as desired. For example, acceleration data could be generated and transmitted about 1000 times per second, with height data being generated and transmitted at 100 times per second and pressure or temperature data being generated and transmitted one (1) time(s) per minute.

As another example, a message having a predetermined number of bits or bytes could be generated that includes a predetermined number of bits or bytes for each output signal. For example, on a transponder having an acceleration sensor and a pressure sensor, the message could have a predetermined total of eight (8) bits with the first three (3) bits corresponding to distance data, the next three (3) bits corresponding to acceleration data, and the remaining two (2) bits corresponding to pressure data. The message could be generated and sent at a frequency corresponding to the needs of the highest output signal data, with the data from the other output signals being ignored or otherwise disposed of if and/or when this data is not being used.

Figure 18:
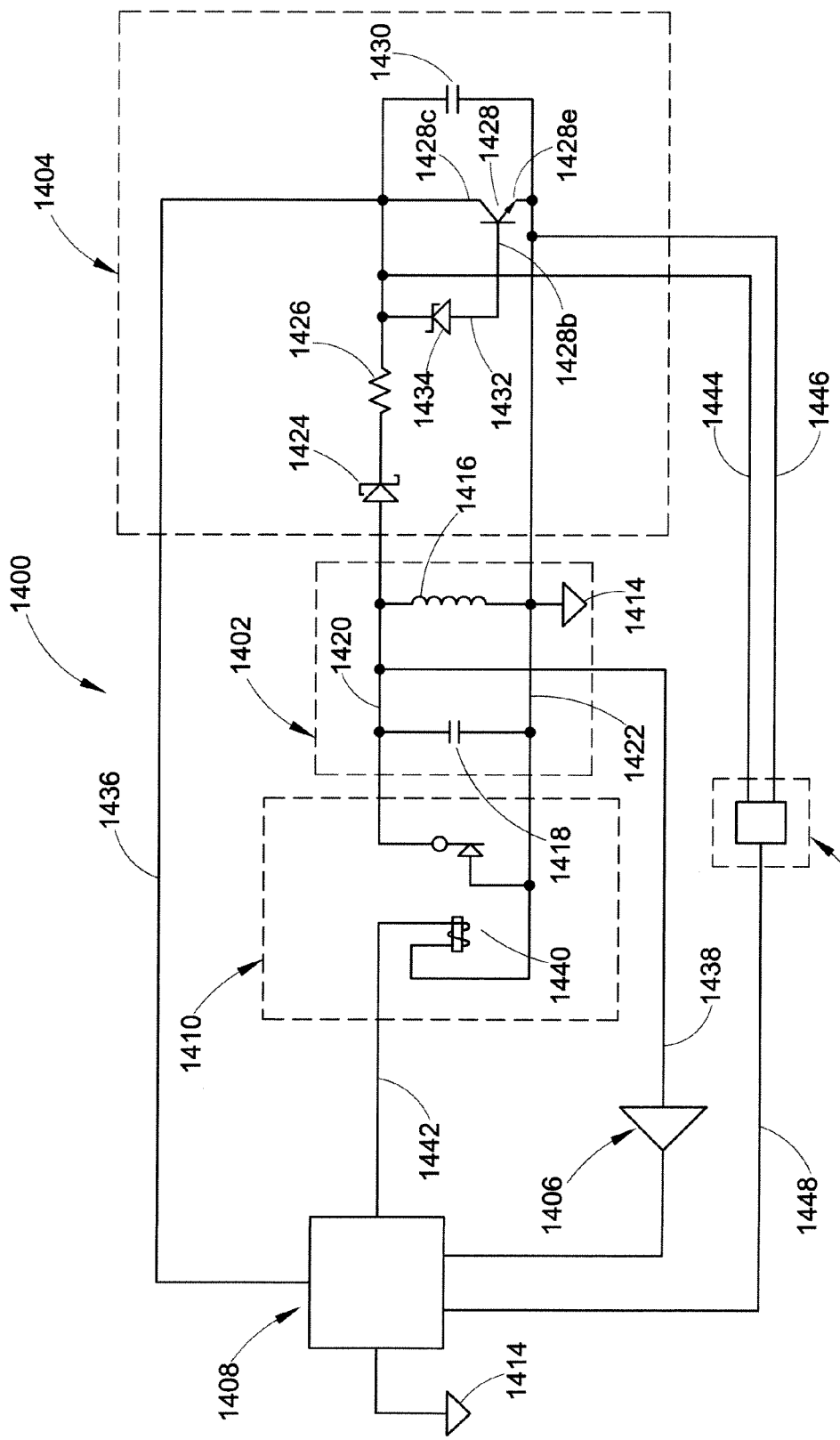
FIG. 18 is a diagram of one embodiment of an electronic circuit operable as the transponder in FIG. 17.

A diagram of one embodiment of a suitable electronic circuit 1400 operable as transponder 1304 is shown in FIG. 18 and includes an antenna circuit 1402, a power circuit 1404, a scaler 1406, a micro-controller 1408 and shunt circuit 1410. Generally, antenna circuit 1402 corresponds to antenna 1322 shown in FIG. 17. Similarly, power circuit 1404 corresponds to power circuit 1324, scaler 1406 corresponds to scaler 1328, micro-controller 1408 corresponds to micro-controller 1326 and shunt circuit 1410 corresponds to shunt circuit 1332. Additionally, circuit 1400 includes a sensor 1412 that generally corresponds to sensor 1318 in FIG. 17. It will be appreciated that additionally sensors of any suitable kind, type and/or quantity can also be used and would generally correspond to sensors 1330 in FIG. 17.

As discussed above, it will be recognized by the skilled artisan that circuit 1400 includes a variety of traditional electrical components including, without limitation, resistors, capacitors, diodes, inductors, transistors and/or other well-known components. It will be appreciated that these components are of substantially standard construction and are commonly available, unless otherwise noted. Additionally, circuit 1400 can be formed as an integral circuit on a unitary substrate, such as on a silicon wafer, for example, or alternately can be formed from discrete components in any suitable manner of implementation and/or using any suitable fabrication techniques. What's more, various portions of circuit 1400 connect to a common ground and these portions are shown generally by terminal arrow 1414.

Antenna circuit 1402 includes an inductor 1416 and a capacitor 1418 connected in parallel between leads 1420 and 1422. Terminal arrow 1414 is connected along lead 1422 adjacent the inductor, which is represented in FIG. 18 by a standard symbol. However, it will be appreciated that tuning or optimizing of the antenna may be desirable to cause the same to be cooperable with another antenna, such as antenna 1308 of transceiver 1302, for example. In such case, inductor 1416 can be formed into a specific shape or arrangement, such as a coil of wire that is formed into a square, circular or loop shape, for example.

Power circuit 1404 is connected to antenna circuit 1402 through leads 1420 and 1422. A diode 1424 and resistor 1426 are connected in series along lead 1420. A transistor 1428 and a capacitor 1430 are connected in parallel between leads 1420 and 1422. The collector terminal 1428*c* of transistor 1428 is connected along lead 1420 and the emitter terminal 1428*e* of the transistor is connected along lead 1422. A lead 1432 connects the base terminal 1428*b* of transistor 1428 to lead 1420 through a diode 1434. In one exemplary embodiment, diode 1424 is a Schottky diode and transistor 1428 is a standard n-p-n transistor, as are well known by those of skill in the art.

Micro-controller 1408 is connected to power circuit 1404 through lead 1436 that connects with lead 1420 from between resistor 1426 and capacitor 1430 adjacent collector terminal 1428*c*. Additionally, micro-controller 1408 is in electrical connection with lead 1420 by lead 1438 through scaler 1406. Micro-controller 1408 can be of any suitable type or configuration. One example of a suitable micro-controller is available from Freescale Semiconductor, Inc., of Austin, Tex., under the designation or part number 68HC05L25. This micro-controller includes a processor, a memory and a clock. Additionally, scaler 1406 can take any suitable form or configuration.

Shunt circuit 1410 includes a relay 1440 connected between leads 1420 and 1422 of antenna circuit 1402 and a lead 1442 that is in electrical communication with micro-controller 1408. It will be appreciated that any suitable switching-type device can be used as an alternative to relay 1440 such as a field-effect transistor (FET), for example.

Sensor 1412 is operatively associated with transponder 1400 and, in one exemplary embodiment, is integrally formed thereon. However, it is to be distinctly understood that the sensors described herein, including, without limitation, sensors 1318, 1320', 1330 and 1412, can be mounted, configured or constructed in any suitable manner or form, either on the associated transponder or as a separate component mounted or otherwise secured adjacent thereto, without departing from the principles of the present novel concept. Sensor 1412 receives electrical power from power circuit 1404 and is connected thereto by leads 1444 and 1446. In the embodiment shown in FIG. 18, lead 1444 is connected to lead 1420 of power supply 1404, and lead 1446 is connected to lead 1422. Sensor 1412 is adapted to output a suitable signal to microprocessor 1408 through lead 1448. It will be appreciated that sensor 1412 is shown in FIG. 18 as being a relatively simply sensor having two leads for powering the sensor and one lead for outputting a sensor signal. However, it will be appreciated that any suitable kind, type or configuration of sensor can be used without departing from the principles of the present novel concept. As such, a greater or lesser number of leads and/or other connections can be used.

Figure 19:
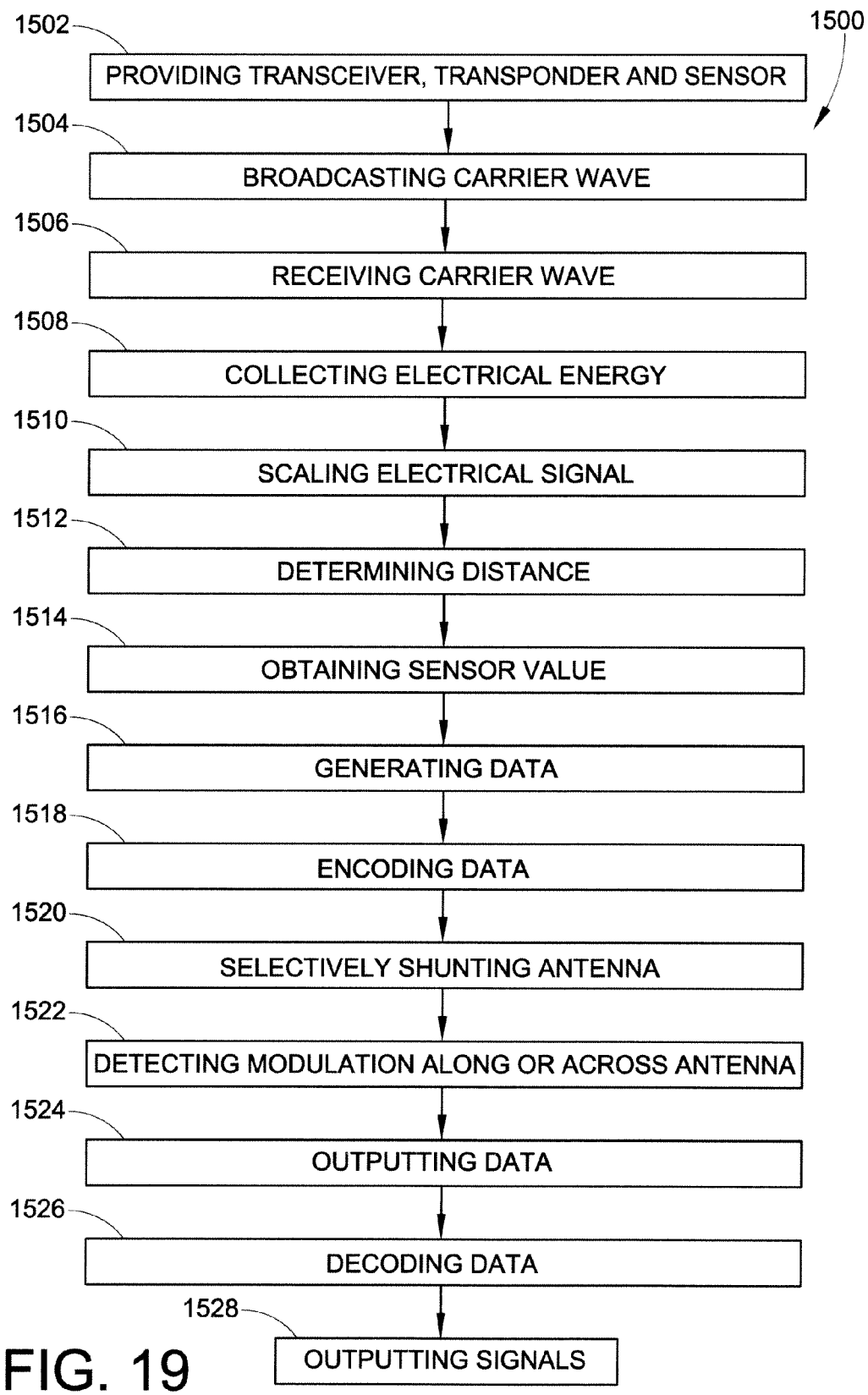
FIG. 19 is a flow chart illustrating steps of one method of sensing and communicating in accordance with the present novel concept.

One exemplary embodiment of a method 1500 of operation of a sensing and communication system in accordance with the present novel concept, such as system 1300, for example, is shown in FIG. 19 and includes a step 1502 of providing a transceiver adapted to broadcast an EM carrier wave, a transponder adapted to receive and modulate the EM carrier wave, and a sensor in communication with the transponder. In one exemplary embodiment, such components include transceiver 1302, transponder 1304 and sensor 1318, for example Another step 1504 includes broadcasting an EM carrier wave, such as from antenna 1308 of transceiver 1302 toward antenna 1322 of transponder 1304, for example. Another step 1506 includes receiving the EM carrier wave at or along an antenna of a transponder, such as antenna 1322 of transponder 1304, for example. An optional step 1508 includes collecting electrical energy generated along and/or across the antenna of the transponder. Such a step could be performed a power circuit, such as power circuit 1324, for example. Step 1508 is optional, however, due to the possibility of using other sources of electrical energy, such as a battery or other power supply to provide electrical energy to the components of the transponder and/or sensor.

Method 1500 also includes a step 1510 of scaling an electrical signal from the antenna of the transponder to a magnitude suitable for use by a processor or microcontroller. In one exemplary embodiment, such a step could be performed by scaler 1328. An optional step 1512 includes determining a distance based upon the scaled electrical signal. Another optional step 1514 includes obtaining a sensor value corresponding to an input acting on or sensed by a sensor. In one exemplary embodiment of method 1500 both of steps 1512 and 1514 are performed. However, it is to be understood that in other embodiments only one of these steps may be used or performed. A further step 1516 includes generating data corresponding to at least one of the distance or sensor value. An optional step 1518 includes encoding the generated data. Still a further step 1520 includes selectively shunting the antenna of the transponder to modulate the antenna of the transceiver and communicate the data. In one exemplary embodiment, each of steps 1514 and 1516, if either one or both are executed, could be performed by a micro-controller, such as micro-controller 1326, for example, in conjunction with scaler 1328 and any sensors (e.g., sensors 1318 and 1330). In such an exemplary embodiment, step 1518 could be performed by the micro-controller, and step 1520 could be performed by the micro-controller in conjunction with a shunt circuit, such as shunt circuit 1332, for example. Another step 1522 includes detecting the modulation along or across the antenna of the transceiver. Still another step 1524 includes outputting data corresponding to the detected modulation. In one exemplary embodiment, steps 1522 and 1524 can be performed by a modulation detector, such as modulation detector 1310, for example. A further optional step 1526 includes decoding the data in a manner cooperative with the optional encoding step 1518, if included. Still a further step 1528 includes outputting data or other digital signals indicative of the distance and/or the sensor value. In one exemplary embodiment, steps 1526 and 1528 could be performed by a micro-controller, such as micro-controller 1312, for example.

Figure 20:
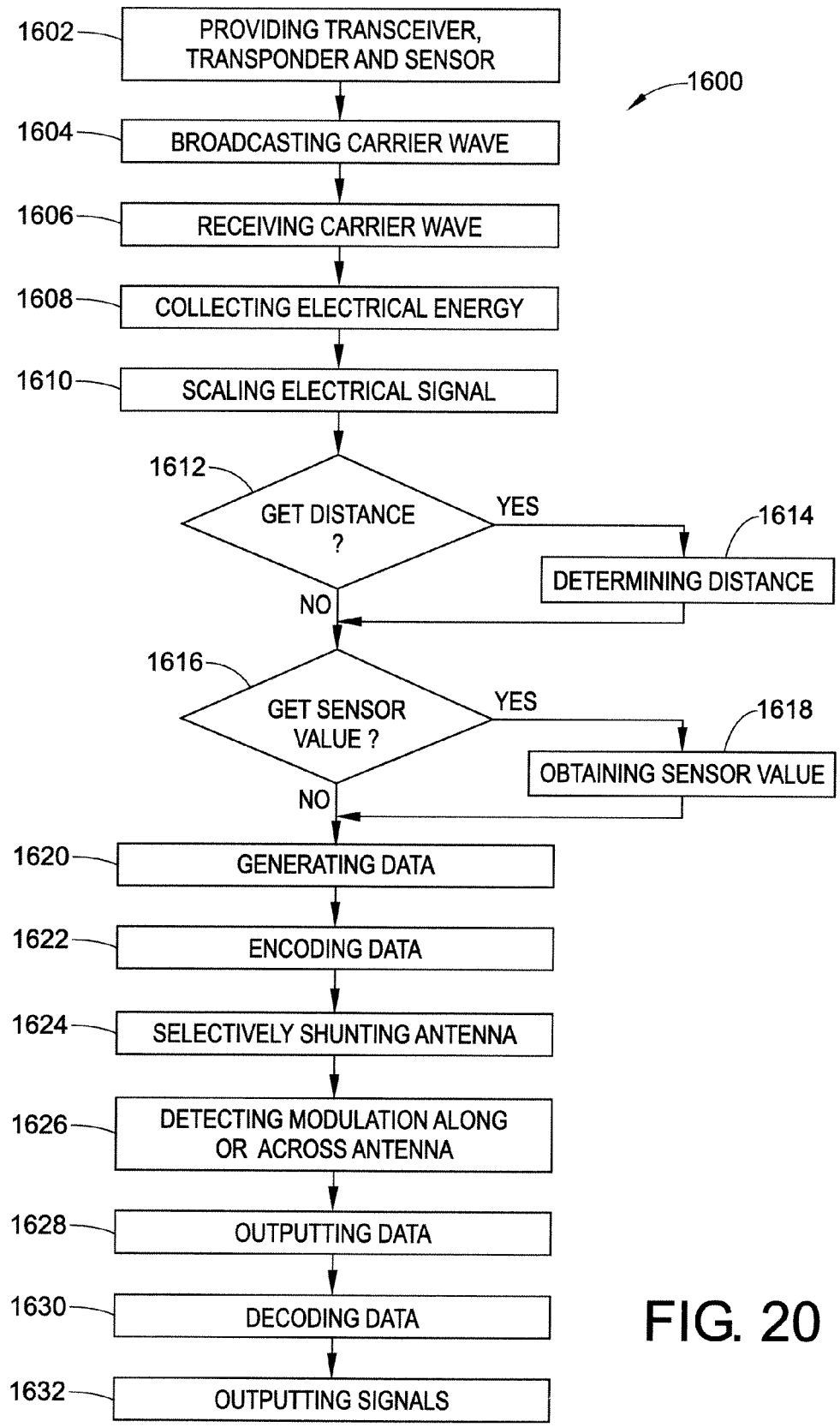
FIG. 20 is a flow chart illustrating steps of another method of sensing and communicating in accordance with the present novel concept.

FIG. 20 illustrates a further exemplary embodiment of a method 1600 of operation in accordance with the present novel concept. Method 1600 is similar to method 1500 described in detail above with regard to FIG. 19, and includes some steps that are substantially identical to those in method 1500. Other steps of method 1600, however, differ from those in method 1500 as are distinctly pointed out and discussed hereinafter. Method 1600 includes a step 1602 of providing a transceiver, a transponder and a sensor, such as transceiver 1302, transponder 1304 and sensor 1318, for example. Another step 1604 includes broadcasting an EM carrier wave, such as from an antenna of the transceiver toward an antenna of the transponder, for example. Another step 1606 includes receiving the EM carrier wave at or along the antenna of the transponder. An optional step 1608 includes collecting electrical energy generated along and/or across the antenna of the transponder. A further step 1610 includes scaling the electrical signal from the antenna of the transponder to a magnitude suitable for use by a processor or micro-controller.

Method 1600 differs from method 1500 in that each repetition of the method steps can selectively include either one or both steps of determining a distance and obtaining a sensor value. Steps 1512 and 1514 of method 1500, though indicated as being optional, can, in one exemplary embodiment, be repeated each time through the method steps shown in FIG. 19. Method 1600 specifically provides for, at decision step 1612, an inquiry as to whether to get a distance. Upon making a YES determination, a step 1614 that includes determining a distance is performed. Upon making a NO determination, method 1600 proceeds to a decision step 1616 and inquires whether to get a sensor value. Upon making a YES determination, a step 1618 is performed and includes obtaining a sensor value. It will be appreciated that either one or both of steps 1616 and 1618 can be repeated any suitable number of times, especially where multiple sensors are provided. Additionally, it will be appreciated that the decision at steps 1612 and 1616 can be based upon any suitable decision points or criteria, such a logic functions and/or time-based functions, for example. In one exemplary embodiment, decision steps 1612 and 1616 are based upon predetermined intervals or frequencies of operation. However, it is to be understood that any other suitable criteria can additionally or alternately be used.

Upon performance of step 1618 or reaching a NO decision in step 1616, another step 1620 that includes generating data corresponding to one or more of the values from steps 1614 and 1618 is performed. An optional step 1622 includes encoding the data generated in step 1620. A further step 1624 includes selectively shunting the antenna of the transponder to modulate the antenna of the transceiver to communicate the data. Another step 1626 includes detecting the modulation of the antenna of the transceiver. Still another step 1628 includes outputting data corresponding to the detected modulation. A further optional step 1630 includes decoding the data in a manner cooperative with the optional encoding step 1622, if provided. Still a further step 1632 includes outputting data or other digital signals indicative of the distance or sensor value determined or obtained.

While the invention has been described with reference to the foregoing embodiments and considerable emphasis has been placed herein on the structures and structural interrelationships between the component parts of the embodiments disclosed, it will be appreciated that other embodiments of the invention can be made and that many changes can be made in the embodiments illustrated and described without departing from the principles of the invention. Obviously, modifications and alterations will occur to others upon reading and understanding the preceding detailed description. Accordingly, it is to be distinctly understood that the foregoing descriptive matter is to be interpreted merely as illustrative of the present invention and not as a limitation. As such, it is intended that the invention be construed as including all such modifications and alterations insofar as the same come within the scope of the appended claims and the equivalents thereof.

The invention claimed is:

1. A vehicle system comprising:
an air spring including a first member and
a second member spaced a distance from said first member;
a transceiver and first antenna associated with said first member, said transceiver configured to broadcast an electromagnetic wave using said first antenna;
a transponder and second antenna associated with said second member, said transponder and said second antenna configured to receive said electromagnetic wave, said transponder configured to short circuit said second antenna for a predetermined period to induce an amplitude variation of said electromagnetic wave, said amplitude variation changing as a distance from said first antenna to said second antenna changes, said transponder configured to receive a sensor output signal, and said transponder configured to cause a modulation of said electromagnetic wave in relation to said output signal; and,
said vehicle system configured to detect and measure said amplitude variation of said broadcasted electromagnetic wave, correlate a specific amplitude variation with a respective distance from said first antenna to said second antenna, and generate a signal representative of said respective distance.

2. The vehicle system according to claim 1 comprising:
a sensor integrally formed on said transponder, said sensor configured to provide said sensor output signal.

3. The vehicle system according to claim 2, wherein said sensor is one of an accelerometer, a pressure transducer and a thermocouple.

4. The vehicle system according to claim 1, wherein said sensor output signal is one of an accelerometer output signal, a pressure transducer output signal and a thermocouple output signal.

5. The vehicle system according to claim 1, wherein said transponder comprises a power circuit operatively connected to said second antenna and is configured to transfer electrical energy, a processor operatively connected to said power circuit, a shunt circuit operatively connected to said second antenna and said processor, and said shunt circuit is configured to be selectively energized by said processor for modulating said electromagnetic wave.

6. The vehicle system according to claim 5, wherein said power circuit is configured to store electrical energy induced by said electromagnetic wave transmitted to said transponder by said transceiver, and said power circuit is configured to supply said electrical energy to said shunt circuit and said processor.

7. The vehicle system according to claim 1 comprising:
an accelerometer operatively connected to said transponder, said accelerometer providing said sensor output signal.

8. The vehicle system according to claim 1, wherein said modulation of said electromagnetic wave in relation to said sensor output signal is one of Frequency Shift Keying modulation, Phase Shift Keying modulation, amplitude modulation and frequency modulation.

9. The vehicle system according to claim 1, wherein said transponder comprises:
a micro-controller;
a shunt circuit operatively connected to said second antenna and said micro-controller; and
a scaler circuit operatively connected to said micro-controller and said second antenna with said scaler circuit configured to receive an input voltage from said second antenna and output a scaled voltage to said micro-controller that is representative of said input voltage.

10. An air spring assembly comprising:
a first end member;
a second end member spaced a distance from said first end member;
a flexible wall secured between said first and second end members;
a transceiver and first antenna associated with said first end member, the transceiver configured to broadcast an electromagnetic wave using said first antenna;
a transponder and second antenna associated with said second end member, said transponder and said second antenna configured to receive said electromagnetic wave, said transponder configured to short circuit said second antenna for a predetermined period to induce an amplitude variation of said electromagnetic wave, said amplitude variation changing as a distance from said first antenna to said second antenna changes, said transponder configured to receive a sensor output signal, and said transponder configured to cause a modulation of said electromagnetic wave in relation to said sensor output signal; and
said air spring assembly configured to detect and measure said amplitude variation of said broadcasted electromagnetic wave.

11. The air spring assembly according to claim 10, wherein said transponder comprises a sensor integrally formed on said transponder and said sensor is configured to provide said sensor output signal.

12. The air spring assembly according to claim 10, wherein said sensor output signal is one of an accelerometer output signal, a pressure transducer output signal and a thermocouple output signal.

13. The air spring assembly according to claim 10, wherein said transponder comprises a power circuit operatively connected to said second antenna and configured to transfer electrical energy, a processor in communication with said power circuit, a shunt circuit in communication with said second antenna and said processor, and said shunt circuit is configured to be selectively energized by said processor for modulating said electromagnetic wave.

14. The air spring assembly according to claim 13, wherein said power circuit is configured to receive and store electrical energy transmitted by said transceiver, and said power circuit is configured to supply electrical energy to said shunt circuit and said processor with said received and stored electrical energy.

15. The air spring assembly according to claim 13 further comprising:
an accelerometer operatively connected to said transponder, said accelerometer providing said sensor output signal.

16. The air spring assembly according to claim 13, wherein said modulation of said electromagnetic wave in relation to said sensor output signal is one of Frequency Shift Keying modulation, Phase Shift Keying modulation, amplitude modulation and frequency modulation.

17. The air spring assembly according to claim 10, wherein said transponder further comprises:
a micro-controller;

a shunt circuit operatively connected to said second antenna and said micro-controller; and a scaler circuit operatively connected to said micro-controller and said second antenna with said scaler circuit configured to receive an input voltage from said second antenna and configured to output a scaled voltage to the micro-controller that is representative of said input voltage.

18. A method of determining a distance between first and second members of an air spring associated with a vehicle, said method comprising:
 a) providing a transceiver and first antenna associated with said first member, said transceiver and said first antenna configured to broadcast an electromagnetic wave;
 b) providing a transponder and second antenna associated with said second member, said transponder and said second antenna configured to receive said electromagnetic wave;
 c) broadcasting an electromagnetic wave using said first antenna and thereby inductively coupling said transceiver and said transponder through said first and second antennae;
 d) short circuiting said second antenna for a predetermined period, said second antenna inducing an amplitude variation of said electromagnetic wave broadcasted by said transceiver, the amplitude variation changing as a distance from said first antenna to said second antenna changes;
 e) detecting said amplitude variation of said broadcasted electromagnetic wave;
 f) determining said distance between said first and second members based at least in part on said detected amplitude variation;
 g) providing a sensor associated with said vehicle, said sensor configured to generate a sensor output signal corresponding to a property associated with said vehicle;
 h) generating said sensor output signal;
 i) causing a modulation of said electromagnetic wave in relation to said sensor output signal; and
 j) determining a value of said property associated with said vehicle based on said modulation.

19. The method according to claim 18, further comprising:
generating a distance signal related to said distance between said first and second members and causing a modulation of said electromagnetic wave in relation to said distance signal.

20. The method according to claim 19, further comprising:
converting said sensor output signal and said distance signal into respective sensor data and distance data, and generating a data message that includes said sensor data and said distance data.

21. The method according to claim 20, further comprising:
communicating said data message to said transceiver by causing selective modulation of said electromagnetic wave, and said transceiver detecting said selective modulation and determining said data message therefrom.

22. The method according to claim 18, further comprising:
said transponder generating a distance signal related to said distance between said first and second members and causing a modulation of said electromagnetic wave in relation to said distance signal.

23. The method according to claim 22, further comprising:
said transponder converting said sensor output signal and said distance signal into respective sensor data and distance data, and generating a data message that includes said sensor data and said distance data.

24. The method according to claim 23, further comprising:
said transponder communicating said data message to said transceiver by causing selective modulation of said electromagnetic wave, and said transceiver detecting said selective modulation and determining said data message therefrom.

* * * * *